United States Patent
Sundell et al.

(10) Patent No.: US 12,091,625 B2
(45) Date of Patent: Sep. 17, 2024

(54) CO$_2$-PHILIC CROSSLINKED POLYETHYLENE GLYCOL-BASED MEMBRANES FOR ACID AND SOUR GAS SEPARATIONS

(71) Applicant: Saudi Arabian Oil Company, Dhahran (SA)

(72) Inventors: Benjamin James Sundell, Arlington, MA (US); John Alden Lawrence, III, Cambridge, MA (US); Seth A. Sharber, Watertown, MA (US); Sibo Lin, Arlington, MA (US); Daniel J. Harrigan, Somerville, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/334,144

(22) Filed: Jun. 13, 2023

(65) Prior Publication Data

US 2023/0340348 A1 Oct. 26, 2023

Related U.S. Application Data

(62) Division of application No. 17/140,386, filed on Jan. 4, 2021, now Pat. No. 11,718,805.

(51) Int. Cl.
*B01D 53/22* (2006.01)
*B01D 67/00* (2006.01)
(Continued)

(52) U.S. Cl.
CPC ............ *C10L 3/104* (2013.01); *B01D 53/228* (2013.01); *B01D 67/0006* (2013.01);
(Continued)

(58) Field of Classification Search
CPC ............. B01D 71/5211; B01D 53/228; B01D 67/0006; B01D 67/009; B01D 67/0095;
(Continued)

(56) References Cited

U.S. PATENT DOCUMENTS 4,383,923 A * 5/1983 Elfert ................. C08G 59/3245
210/500.28
4,405,534 A * 9/1983 Deisenroth ............. C06B 45/10
149/9

(Continued)

FOREIGN PATENT DOCUMENTS

| WO | WO 2018222255 | 12/2018 |
| WO | WO 2020087067 | 4/2020 |
| WO | WO 2020180353 | 9/2020 |

OTHER PUBLICATIONS

Arthanareeswaran et al., "Studies on Performance of Cellulose Acetate and Poly(Ethelene Glycol) Blend Ultrafiltration Membranes Using Mixture Design Concept of Design of Experiments," International Journal of Polymeric Materials and Polymeric Biomaterials, 55(12), 2006, 1133-1154, 24 pages.

(Continued)

*Primary Examiner* — Anthony R Shumate
(74) *Attorney, Agent, or Firm* — Fish & Richardson P.C.

(57) ABSTRACT

This disclosure relates to CO$_2$-philic crosslinked polyethylene glycol membranes useful for natural gas purification processes. Also provided are methods of using the membranes to remove CO$_2$ and H$_2$S from natural gas.

12 Claims, 12 Drawing Sheets

(51) Int. Cl.
  B01D 69/02 (2006.01)
  B01D 71/52 (2006.01)
  B01J 31/24 (2006.01)
  C08F 290/06 (2006.01)
  C10L 3/10 (2006.01)
(52) U.S. Cl.
  CPC ....... *B01D 67/009* (2013.01); *B01D 67/0095* (2013.01); *B01D 69/02* (2013.01); *B01D 71/5211* (2022.08); *B01J 31/2452* (2013.01); *C08F 290/062* (2013.01); *C10L 3/103* (2013.01); *B01D 2323/30* (2013.01); *B01D 2323/345* (2013.01); *B01J 2231/327* (2013.01); *B01J 2531/16* (2013.01); *C10L 2290/548* (2013.01)
(58) Field of Classification Search
  CPC ................ B01D 69/02; B01D 2323/30; B01D 2323/345; B01D 2252/20415; C10L 3/104; C10L 3/103; B01J 31/2452; B01J 2231/327; B01J 2531/16; C08F 290/062
  See application file for complete search history.

(56) References Cited

U.S. PATENT DOCUMENTS

| | | | |
|---|---|---|---|
| 4,874,818 A | 10/1989 | Yamamoto et al. | |
| 5,158,636 A | 10/1992 | Groitzsch | |
| 5,804,611 A * | 9/1998 | Takoh | C08F 290/062 524/378 |
| 6,112,908 A * | 9/2000 | Michaels | B01D 67/0088 428/509 |
| 6,120,900 A * | 9/2000 | Sargeant | B41M 5/52 428/216 |
| 6,270,905 B1 * | 8/2001 | Swarup | C08F 290/062 428/522 |
| 11,524,263 B1 | 12/2022 | Paulson | |
| 11,718,805 B2 | 8/2023 | Sundell et al. | |
| 2003/0125414 A1 * | 7/2003 | Nakajima | C09B 67/0089 526/287 |
| 2003/0203199 A1 | 10/2003 | Song et al. | |
| 2006/0127335 A1 | 6/2006 | Nakamura et al. | |
| 2007/0065743 A1 | 3/2007 | Huang et al. | |
| 2007/0196668 A1 | 8/2007 | Heischkel et al. | |
| 2009/0137172 A1 | 5/2009 | Huang et al. | |
| 2012/0046403 A1 * | 2/2012 | Tsukuma | C08L 67/025 524/539 |
| 2012/0061045 A1 | 3/2012 | Huizing et al. | |
| 2013/0012647 A1 * | 1/2013 | Mihara | C08G 18/8116 524/544 |
| 2013/0172476 A1 * | 7/2013 | Sasamoto | C08F 283/065 524/544 |
| 2013/0309510 A1 * | 11/2013 | Isogai | C08F 290/067 524/561 |
| 2014/0107278 A1 * | 4/2014 | Ozaki | C08F 259/08 526/247 |
| 2014/0319706 A1 | 10/2014 | Huizing et al. | |
| 2015/0064486 A1 | 3/2015 | Arai et al. | |
| 2015/0083321 A1 | 3/2015 | Yuodelis | |
| 2018/0021742 A1 | 1/2018 | Nulwala et al. | |
| 2019/0358593 A1 | 11/2019 | Staudt et al. | |
| 2021/0246349 A1 * | 8/2021 | Furukawa | C08G 18/6237 |
| 2021/0268447 A1 | 9/2021 | Li et al. | |

OTHER PUBLICATIONS

Baumann et al., "Synthesis and characterization of novel PDMS Nanocomposites Using POSS Derivatives as Cross-Linking Filler," J. Polym. Sci.: Part A: Polym. Chem., 47, 2009, 2589-2596, 8 pages.

Belcher et al., "Novel low-temperature POSS-containing siloxane elastomers," NASA Technical Reports, 11 pages.

Car et al., "PEG modified poly(amide-b-ethylene oxide) membranes for CO2 separation," Journal of Membrane Science, 307(1), 2008, 88-95, 8 pages.

D'Arcy et al., "Mitsunobu Reaction: A Versatile Tool for PEG End Functionalization," Macromolecular Rapid Communications, 2015, 1829-1835, 7 pages.

García et al., "Recyclable, Strong Thermosets and Organogels via Paraformaldehyde Condensation with Diamines," Science, 344(6185), 2014, 732-735, 4 pages.

Geise et al., "Water permeability and water/salt selectivity tradeoff in polymers for desalination," J. Membr. Sci., 369(1-2), 2011, 130-138, 9 pages.

Gholizadeh et al., "Removal of hydrogen sulfide from methane using PEO segmented copolymer-based multilayer composite membrane," Separation Science and Technology, 52(13), 2017, 2190-2198, 9 pages.

Guo et al., "Rhodium Nanoflowers Stabilized by a Nitrogen-Rich PEG-Tagged Substrate as Recyclable Catalyst for the Stereoselective Hydrosilylation of Internal Alkynes," Advanced Synthesis & Catalysis, 357.1, Dec. 2014, 89-99, 12 pages.

Guo et al., "Water-Soluble Gold Nanoparticles: From Catalytic Selective Nitroarene Reduction in Water to Refractive Index Sensing," Chemistry—An Asian Journal, 10.11, Nov. 2015, 2437-2443, 7 pages.

Harada et al., "The molecular necklace: a rotaxane containing many threaded α-cyclodextrins," Nature, 356(6367), 1992, 325-327, 3 pages.

Isfahani et al., "Enhancement of $CO_2$ capture by polyethylene glycol-based polyurethane membranes," Journal of Membrane Science, 542, 2017, 143-149, 7 pages.

Ju et al., "Characterization of sodium chloride and water transport in crosslinked poly(ethylene oxide) hydrogels," Journal of Membrane Science, 358(1-2), 2010, 131-141, 11 pages.

Kammakakam et al., "PEG-imidazolium-functionalized 6FDA-durene polyimide as a novel polymeric membrane for enhanced $CO_2$ separation," RSC Advances, 6(37), 2016, 31083-31091, 9 pages.

Khan et al., "Enhanced gas permeability by fabricating mixed matrix membranes of functionalized multiwalled carbon nanotubes and polymers of intrinsic microporosity (PIM)," Journal of Membrane Science, 436(Supplement C), 2013, 109-120, 12 pages.

Kraftschik et al., "Cross-Linkable Polyimide Membranes for Improved Plasticization Resistance and Permselectivity in Sour Gas Separations," Macromolecules, 46(17), 2013, 6908-6921, 14 pages.

Kwisnek et al., "Multifunctional thiols as additives in UV-cured PEG-diacrylate membranes for $CO_2$ separation," J. Membr. Sci., 369, 2011, 429-436, 8 pages.

Lee et al., "Disulfonated Poly(arylene ether sulfone) Random Copolymer Blends Tuned for Rapid Water Permeation via Cation Complexation with Poly(ethylene glycol) Oligomers," Chem. Mater., 23, 2011, 1039-1049, 11 pages.

Lee et al., "Interactions of $CO_2$ with various functional molecules," Physical Chemistry Chemical Physics, Mar. 2015, 17(16): 10925-10933, 9 pages.

Li et al., "Modification of Nanoporous Silicon Nitride with Stable and Functional Organic Monolayers," Chemistry of Materials, 2017, 9 pages.

Lin et al., "Plasticization-Enhanced Hydrogen Purification Using Polymeric Membranes," Science, Jan. 2006, 311(5761):639, 5 pages.

Lin et al., "The Effect of Cross-Linking on Gas Permeability in Cross-Linked Poly(Ethylene Glycol) Diacrylate)," Macromolecules, 38 (20), 2005, 8381-8393, 13 pages.

Loch et al., "Synthesis of PEG-iridium conjugates and their use as hydrogenation catalysts in a water/substrate two-phase medium," Journal of Molecular Catalysis A: Chemical, 170(1):2001, 75-80, 6 pages.

Mei et al., "Towards enhanced $CO_2$ selectivity of the PIM-1 membrane by blending with polyethylene glycol," Journal of Membrane Science, 493, 2015, 28 pages.

Moitra et al., "Convenient route to water-sensitive sol-gel precursors using click chemistry," Chem. Commun., Sep. 2010, 46, 8416-8418, 3 pages.

(56) References Cited

OTHER PUBLICATIONS

Oh et al., "Thermal analysis of disulfonated poly(arylene ether sulfone) plasticized with poly(ethylene glycol) for membrane formation," Polymer, 5, 2014, 235-247, 13 pages.

Reijerkerk et al., "Poly(ethylene glycol) and poly(dimethyl siloxane): Combining their advantages into efficient $CO_2$ gas separation membranes," Journal of Membrane Science, 352(1), 2010, 126-135, 10 pages.

Sagle et al., "PEG-coated reverse osmosis membranes: Desalination properties and fouling resistance," J. Membr. Sci., 340, 2009, 92-108, 17 pages.

Saimani et al., "Separation performance of asymmetric membranes based on PEGDa/PEI semiinterpenetrating polymer network in pure and binary gas mixtures of CO2, N2 and CH4," Journal of Membrane Science, 362(1): 2010, 353-359, 7 pages.

Wang et al., "Graphene Oxide Membranes with Heterogeneous Nanodomains for Efficient $CO_2$ Separations," Angewandte Chemie International Edition, 56(45), 2017, 14246-14251, 6 pages.

Woo et al., "Thermally rearranged poly(benzoxazole-co-imide) hollow fiber membranes for $CO_2$ capture," Journal of Membrane Science, 498: 2016, 125-134, 10 pages.

Xie et al., "MOF Scaffold for a High-Performance Mixed-Matrix Membrane," Angewandte Chemie International Edition, 57(28), 2018, 8597-8602, 7 pages.

Yuan et al., "Allyl ether-modified unsaturated polyesters for UV/air dual-curable coatings. I: Synthesis and characterization of the oligomers and their cured films," Journal of Applied Polymer Science, 92(5), 2004, 2765-2770, 6 pages.

Zhu et al., "Green fabrication of a positively charged nanofiltration membrane by grafting poly(ethylene imine) onto a poly (arylene ether sulfone) membrane containing tertiary amine groups," Journal of Membrane Science, 2016, 8 pages.

PCT International Search Report and Written Opinion in International Appln. No. PCT/US2022/011199, dated Apr. 26, 2022, 14 pages.

* cited by examiner

CO₂-PHILIC CROSSLINKED POLYETHYLENE GLYCOL-BASED MEMBRANES FOR ACID AND SOUR GAS SEPARATIONS

CROSS-REFERENCE TO RELATED APPLICATIONS

This application is a divisional of and claims the benefit of priority to U.S. patent application Ser. No. 17/140,386, filed on Jan. 4, 2021, the contents of which are hereby incorporated by reference.

TECHNICAL FIELD

This document relates to methods of separating $CO_2$ and $H_2S$ from natural gas and $CO_2$-philic crosslinked polyethylene glycol (PEG) membranes used in the methods.

BACKGROUND

Natural gas is an important energy source that continues to increase in production and usage throughout the world. Before usage as a fuel or energy source, methane ($CH_4$), the desired component of natural gas, must often be separated from contaminant gases that may be benign ($N_2$, water vapor), valuable ($C_{3+}$ hydrocarbons), or toxic and/or corrosive ($CO_2$, $H_2S$). Hydrogen sulfide ($H_2S$) is a particularly toxic gas with high corrosion potential, and natural gas containing $H_2S$ (also known as sour gas) must be processed to low ppm levels of $H_2S$ before pipeline distribution.

According to the International Energy Agency, up to 43% of the world's gas reservoirs contain sour gas, including many reservoirs in Russia, Canada, and the Middle East. Sour gas can be treated via natural gas "sweetening" using amine scrubbers and sorbents, though this costly technology often limits the economic feasibility of producing from various reservoirs. Polymeric membranes offer an energy-efficient alternative to sorption-based technology, with up to 90% lower energy costs compared to conventional means of gas separations (for example, distillation). Though membranes have been widely adopted, especially in natural gas separations, they often suffer from fundamental drawbacks including tradeoff relationships between separation efficiency (selectivity) and gas throughput/productivity (permeability), instability in realistic reservoirs, plasticization/ swelling, and in the case of sour gas separations, tradeoff relationships between $CO_2/CH_4$ and $H_2S/CH_4$ separations. In general, membranes that are effective in $H_2S/CH_4$ separations generally have poor $CO_2$ performance, and many natural gas reservoirs contain both of these gases in high concentrations that need to be separated.

Therefore, there is a need for a membrane that is able to separate both $CO_2$ and $H_2S$ from natural gas. There is also a need for a membrane with improved gas permeability and $H_2S/CH_4$ selectivity as compared to membranes typically used for natural gas separation.

SUMMARY

Provided in the present disclosure is a $CO_2$-philic polyethylene glycol (PEG) compound of Formula (I):

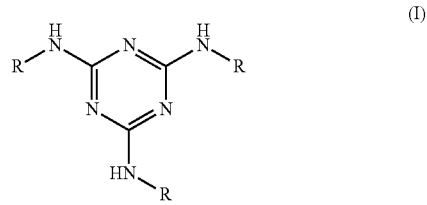

wherein:

R is selected from the group consisting of:

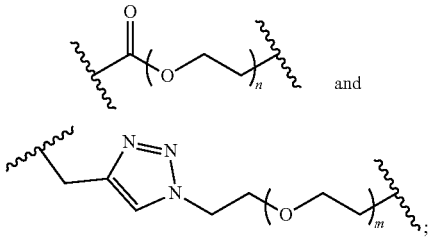

each n is independently an integer between 1 and 100; and each m is independently an integer between 1 and 100.

In some embodiments, the compound of Formula (I) is a compound of Formula (Ia):

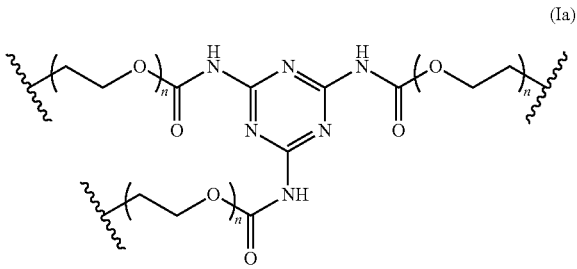

wherein each n is independently an integer between 1 and 100. In some embodiments, each n is independently an integer between 4 and 50. In some embodiments, each n is independently an integer between 4 and 20.

In some embodiments, the compound of Formula (I) is a compound of Formula (Ib):

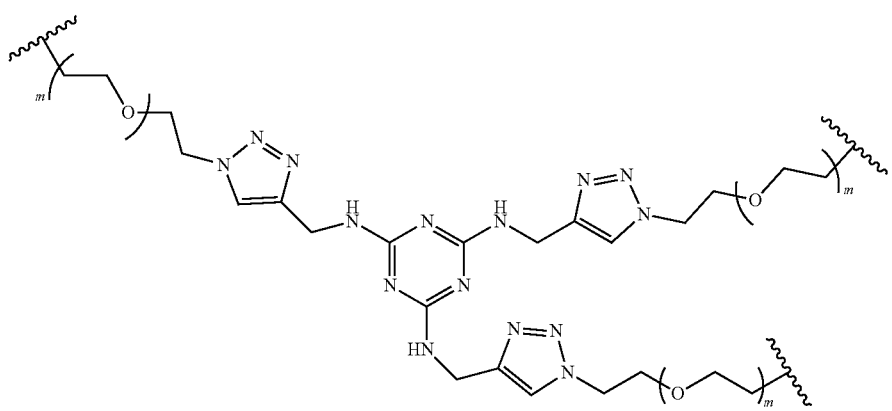

wherein each m is independently an integer between 1 and 100. In some embodiments, each m is independently an integer between 4 and 50. In some embodiments, each m is independently an integer between 4 and 20.

Also provided in the present disclosure is a $CO_2$-philic membrane, the membrane including a crosslinked $CO_2$-philic polyethylene glycol (PEG) compound of Formula (I):

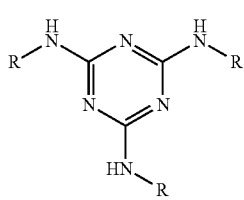

wherein:
R is selected from:

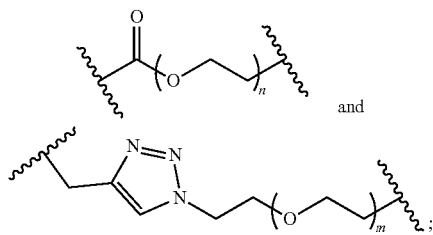

each n is independently an integer between 1 an 100; an each m is independently an integer between 1 and 100.

In some embodiments of the membrane, the compound of Formula (I) is a compound of Formula (Ia):

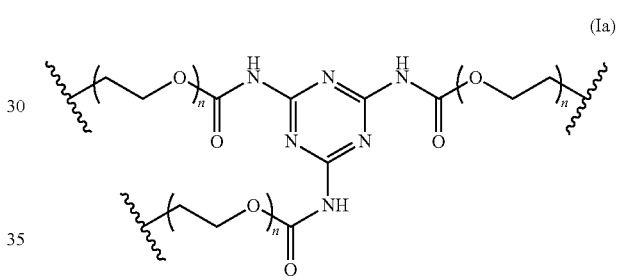

wherein each n is independently an integer between 1 and 100. In some embodiments, each n is independently an integer between 4 and 50. In some embodiments, each n is independently an integer between 4 and 20.

In some embodiments of the membrane, the compound of Formula (I) is a compound of Formula (Ib):

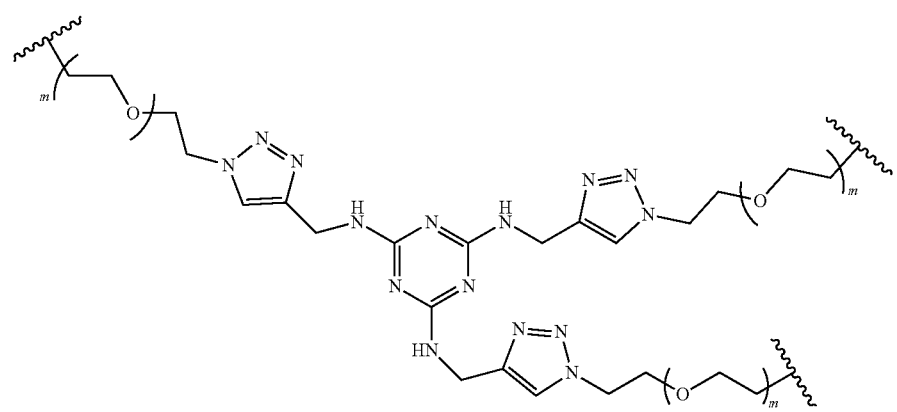

wherein each m is independently an integer between 1 and 100. In some embodiments, each m is independently an integer between 4 and 50. In some embodiments, each m is independently an integer between 4 and 20.

In some embodiments, the membrane demonstrates enhanced gas separation performance in the sequestration of $CO_2$ and $H_2S$ from natural gas as compared to a membrane that does not contain the $CO_2$-philic PEG compound.

In some embodiments, the membrane exhibits a $CO_2$-permeability increase of about 2,000% to about 4,000% as compared to a membrane that does not contain the $CO_2$-philic PEG compound.

In some embodiments, the membrane exhibits a $H_2S$-permeability increase of about 2,000% to about 4,000% as compared to a membrane that does not contain the $CO_2$-philic PEG compound.

In some embodiments, the membrane exhibits a $H_2S/CH_4$ selectivity increase of about 30% to about 60% as compared to a membrane that does not contain the $CO_2$-philic PEG compound.

Also provided is a method of preparing a $CO_2$-philic membrane, the method comprising reacting a PEG acrylate compound with a melamine-based crosslinker in the presence of a photocrosslinking initiator; and curing the resulting mixture under UV irradiation to form a membrane.

In some embodiments of the method, the PEG acrylate compound is a PEG-diacrylate (PEGDA) compound, a PEG-methyl ether acrylate (PEGMEA) compound, or combination thereof. In some embodiments, the PEGDA compound has the formula:

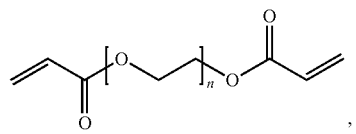

wherein n is an integer between 1 and 100 or between 4 and 50 or between 4 and 20. In some embodiments, the PEG-MEA compound has the formula:

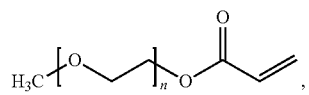

wherein n is an integer between 1 and 100 or between 4 and 50 or between 4 and 20.

In some embodiments of the method, the melamine-based crosslinker has the formula:

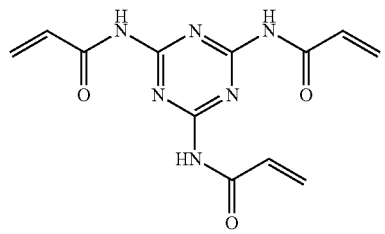

In some embodiments, the method further includes preparing the melamine-based crosslinker by reacting 1,3,5-triazine-2,4,6-triamine with acryloyl chloride.

Also provided in the present disclosure is a method of preparing a $CO_2$-philic membrane, the method comprising reacting a PEG azide compound with a melamine-based crosslinker in the presence of a copper catalyst; and drying the resulting mixture to form a membrane.

In some embodiments of the method, the PEG azide compound is a compound having the formula:

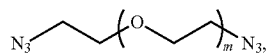

wherein m is an integer between 1 and 100 or between 4 and 50 or between 4 and 20.

In some embodiments of the method, the melamine-based crosslinker has the formula:

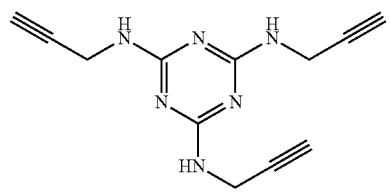

In some embodiments, the method further includes preparing the melamine-based crosslinker by reacting 2,4,6-trifluoro-1,3,5-triazine with prop-2-yn-1-amine.

Also provided is a method of separating $CO_2$ and $H_2S$ from natural gas, the method comprising:
providing a $CO_2$-philic membrane comprising a $CO_2$-philic polyethylene glycol (PEG) compound of Formula (I):

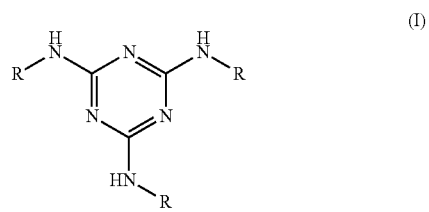

wherein:
R is selected from:

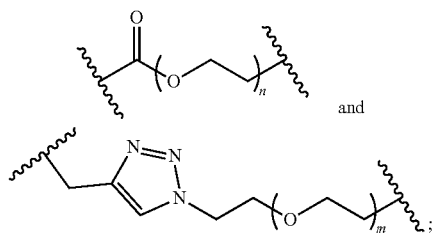

each n is independently an integer between 1 and 100; and
each m is independently an integer between 1 and 100;
introducing a natural gas stream to the membrane; and
removing $CO_2$ and $H_2S$ from the natural gas.

In some embodiments of the method, the compound of Formula (I) is selected from:

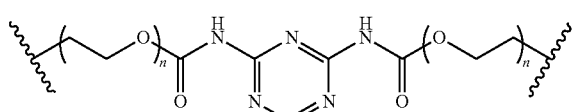

and

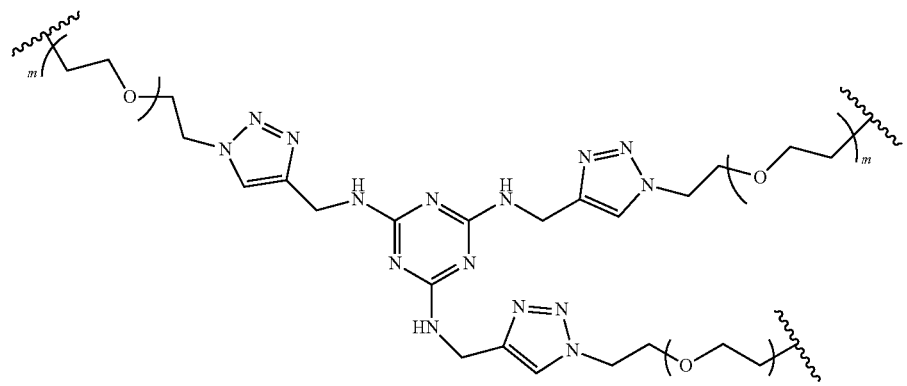

wherein:
each n is independently an integer between 4 and 50; and
each m is independently an integer between 4 and 50.

DETAILED DESCRIPTION

Figure 1:
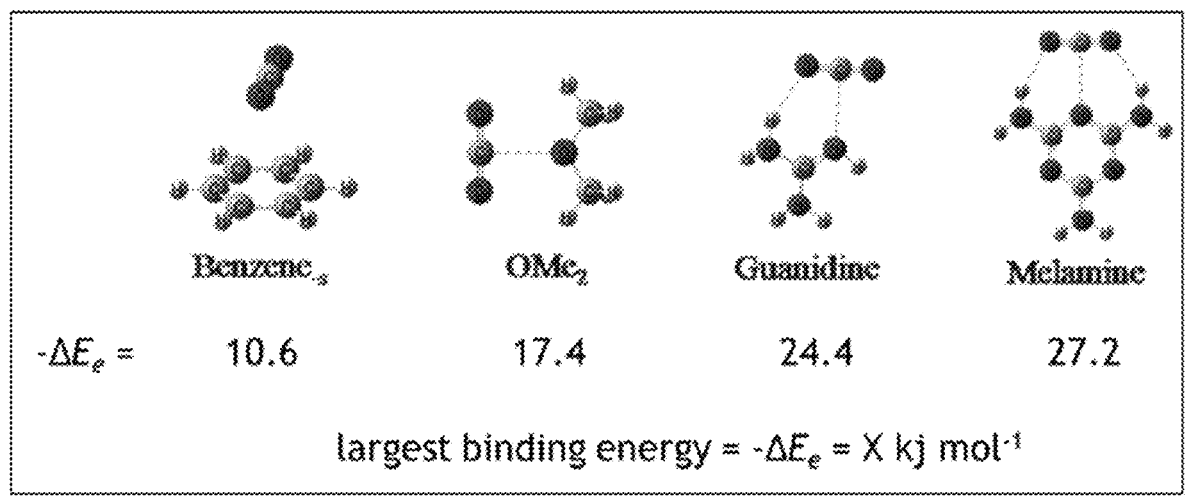
FIG. 1 shows the $-\Delta E_e$ values of $CO_2$ with benzene, $OMe_2$, guanidine, and melamine.

The present disclosure relates to improved methods of separating both $H_2S$ and $CO_2$ from natural gas and improving $CO_2/CH_4$ and $H_2S/CH_4$ selectivity by using polyethylene glycol (PEG) membranes that incorporate $CO_2$-philic crosslinkers. Also provided in the present disclosure are $CO_2$-philic PEG membranes and $CO_2$-philic PEG compounds that make up the membranes. The $CO_2$-philic PEG compounds can be prepared by reacting a functionalized melamine derivative with a PEG compound. In some embodiments, the functionalized melamine derivative is selected from a photo-curable crosslinker and a click crosslinker. In some embodiments, the PEG compound is a PEG acrylate compound, such as a PEG diacrylate or a PEG methyl ether acrylate. In some embodiments, the PEG compound is a PEG azide compound. In some embodiments, the membrane contains a $CO_2$-philic PEG compound prepared by reacting a functionalized melamine derivative, such as a photo-curable crosslinker, with a PEG acrylate compound. In some embodiments, the membrane contains a $CO_2$-philic PEG compound prepared by reacting a functionalized melamine derivative, such as a click crosslinker, with a PEG azide compound.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "telechelic," when referring to polyethylene glycol, means a PEG having functionalized end-groups. A telechelic PEG compound is capable of entering into further polymerization or other reactions through its reactive end-groups.

$CO_2$-Philic Membranes

Polyethylene glycol (PEG) membranes are a commercialized class of gas separation membranes that can be used in applications including flue gas separations, hydrogen purification, and sour gas separations. While typical PEG membranes may demonstrate high performance in $H_2S$ separations, high performance of both $CO_2$ permeability and $CO_2/CH_4$ selectivity is more difficult to achieve. In the present disclosure, provided are PEG membranes that incorporate a $CO_2$-philic crosslinker crosslinked with a telechelic PEG compound to form a membrane. Also provided are methods for improving the $CO_2$ and $H_2S$ separation performance of a PEG membrane by incorporating $CO_2$-philic crosslinkers into the membrane. In some embodiments, the PEG membrane is prepared by crosslinking telechelic PEG with a $CO_2$-philic crosslinker. In some embodiments, the $CO_2$-philic crosslinker is a melamine-based crosslinker. Without wishing to be bound by any particular theory, it is believed that the heterocyclic content of melamine favorably interacts with $CO_2$ and $H_2S$, thus imbuing $CO_2$-philicity to the PEG network.

Thus, provided in the present disclosure are $CO_2$-philic membranes that contain a crosslinked $CO_2$-philic polyethylene glycol (PEG) compound of Formula (I):

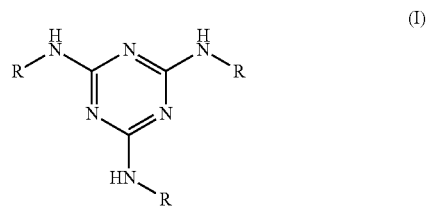

wherein:
R is selected from:

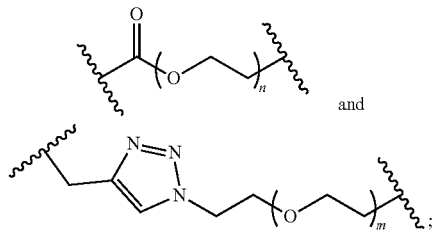

wherein R, n, and m are as described elsewhere in the disclosure.

In some embodiments, the membranes that contain the $CO_2$-philic PEG compounds of the present disclosure demonstrate enhanced gas separation performance in the sequestration of $CO_2$ and $H_2S$ from natural gas as compared to a membrane that does not contain the $CO_2$-philic PEG compound.

Melamine-Based Crosslinkers

The $CO_2$-philic membranes of the present disclosure contain a $CO_2$-philic PEG compound. In some embodiments, the $CO_2$-philic PEG compound contains a $CO_2$-philic crosslinker that has been crosslinked to a telechelic PEG compound. In some embodiments, the $CO_2$-philic crosslinker is melamine-based. Based on computational models, $CO_2$ was found to bind more readily to the primary amine groups of melamine than to benzene. As shown in FIG. 1 (adapted from Lee et al., "Interactions of $CO_2$ with various functional molecules," Physical Chemistry Chemical Physics, 17(16):10925-10933 (2015)), where higher negative $\Delta E_e$ values correspond to preferable interactions and lower energy states with $CO_2$, melamine strongly associates with $CO_2$. Without wishing to be bound by any theory, it is believed that the melamine-based crosslinkers of the present disclosure have favorable interaction energies with $CO_2$ and thus, presumably, $H_2S$. As shown in the present disclosure, inclusion of a melamine-based crosslinker into a PEG network promotes $CO_2$-philicity. In some embodiments, the melamine-based crosslinker is a photo-curable crosslinker. In some embodiments, the melamine-based crosslinker is a click crosslinker.

Photo-Curable Crosslinkers

In some embodiments, the melamine-based crosslinker is a photo-curable crosslinker. In some embodiments, the photo-curable crosslinker is melamine functionalized with acrylamide or allyl groups or combinations thereof. In some embodiments, the photo-curable crosslinker is melamine functionalized with allyl groups. In some embodiments, the photo-curable crosslinker is melamine functionalized with acrylamide groups. In some embodiments, the melamine-based crosslinker is a photo-curable crosslinker having the structure:

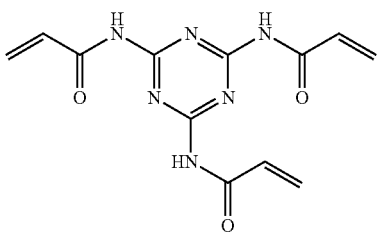

In some embodiments, the photo-curable crosslinker is prepared by reacting 1,3,5-triazine-2,4,6-triamine with acryloyl chloride.

In some embodiments, the photo-curable crosslinker uses allyl groups to photochemically crosslink acrylate-functionalized PEG. In some embodiments, the photo-curable crosslinker uses acrylamide groups to photochemically crosslink acrylate-functionalized PEG. In some embodiments, the photo-curable crosslinker shows promising gas separation performance when incorporated into a PEG membrane of the present disclosure.

Click Crosslinkers

In some embodiments, the melamine-based crosslinker is a click crosslinker. In some embodiments, the click crosslinker is melamine functionalized with terminal alkyne groups. In some embodiments, the melamine-based crosslinker is a click crosslinker having the structure:

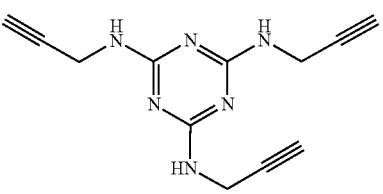

In some embodiments, the click crosslinker is prepared by reacting 2,4,6-trifluoro-1,3,5-triazine with prop-2-yn-1-amine.

In one embodiment, the click crosslinker is functionalized with terminal alkyne groups to crosslink via click chemistry with an azide-terminated telechelic PEG. A "click crosslinker," as used herein, refers to a crosslinker, such as a melamine-based crosslinker of the present disclosure, that is capable of participating in click chemistry or a click reaction. As used herein, "click chemistry" or "click reaction" refers to the Huisgen cycloaddition or the 1,3-dipolar cycloaddition between an azide and an alkyne to form a 1,2,4-triazole. In some embodiments, the click crosslinker of the present disclosure contains one or more terminal alkyne groups and the telechelic PEG compound contains two terminal azide groups. In some embodiments, the click reaction between the alkyne and the azide takes place in the presence of a copper catalyst. In some embodiments, the copper catalyst is a copper (I) catalyst. In some embodiments, the copper catalyst is bromotris(triphenylphosphine) copper (I) (CuBr(PPh$_3$)$_3$).

CO$_2$-Philic PEG Compounds

The CO$_2$-philic melamine-based crosslinkers of the present disclosure can be crosslinked with a telechelic PEG compound to form a CO$_2$-philic PEG compound. In some embodiments, inclusion of a PEG membrane containing a CO$_2$-philic PEG compound of the present disclosure increases gas permeability (for example, CO$_2$, H$_2$S, or both) by several orders of magnitude as compared to the same PEG membrane that does not include the CO$_2$-philic PEG compound. In some embodiments, the CO$_2$-philic PEG compounds yield membranes with greatly improved H$_2$S/CH$_4$ selectivity compared to a PEG membrane with a non-CO$_2$-philic PEG compound.

In some embodiments, the CO$_2$-philic PEG compound is a compound of Formula (I):

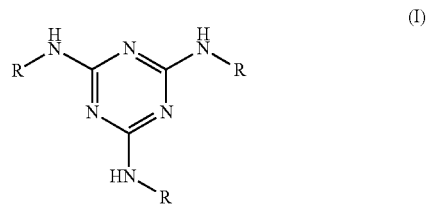

wherein:

R is selected from the group consisting of:

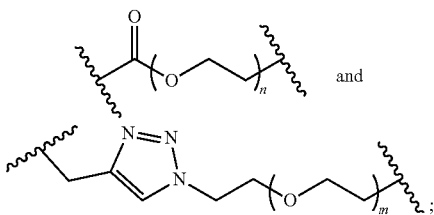

each n is independently an integer between 1 and 100; and
each m is independently an integer between 1 and 100.

In some embodiments, each n is independently an integer between 1 and 100, such as between 1 and 75, between 1 and 50, between 1 and 25, between 1 and 15, between 1 and 10, between 4 and 50, between 4 and 20, between 10 and 40, between 10 and 25, between 20 and 30, between 10 and 15, or 1, 2, 3, 4, 5, 6, 7, 8, 9, 10, 11, 12, 13, 14, 15, 16, 17, 18, 19, 20, 25, 30, 35, 40, 45, or 50. In some embodiments, each n is independently an integer between 4 and 50. In some embodiments, each n is independently an integer between 1 and 25. In some embodiments, each n is independently an integer between 4 and 20.

In some embodiments, each m is independently an integer between 1 and 100, such as between 1 and 75, between 1 and 50, between 1 and 25, between 1 and 15, between 1 and 10, between 4 and 50, between 4 and 20, between 10 and 40, between 10 and 25, between 20 and 30, between 10 and 15, or 1, 2, 3, 4, 5, 6, 7, 8, 9, 10, 11, 12, 13, 14, 15, 16, 17, 18, 19, 20, 25, 30, 35, 40, 45, or 50. In some embodiments, each m is independently an integer between 4 and 50. In some embodiments, each m is independently an integer between 1 and 25. In some embodiments, each m is independently an integer between 4 and 20.

The value of n and m can correspond to the amount of CO$_2$-philic crosslinker loading. Without wishing to be bound by any particular theory, it is believed that, to a certain point, lower values of n and m can improve gas transport properties by increasing loading of the CO$_2$-philic crosslinker. For example, the value of each n and m can independently be an integer of about 100 or less, such as about 50 or less, or about 20 or less, or about 4 or less.

In some embodiments, one or more additives are added during the crosslinking step between the CO$_2$-philic melamine-based crosslinkers of the present disclosure and the telechelic PEG compound. The additives can be removed upon completion of the crosslinking. Suitable additives include, but are not limited to, isolobal additives such as CO$_2$, CS$_2$, isocyanates, and carbodiimides.

PEG Compounds Containing a Photo-Curable Crosslinker

In some embodiments, the CO$_2$-philic photo-curable crosslinkers of the present disclosure are reacted with a telechelic PEG compound to form a CO$_2$-philic PEG compound incorporating the photo-curable crosslinker. In some embodiments, the CO$_2$-philic PEG compound is a compound of Formula (Ia):

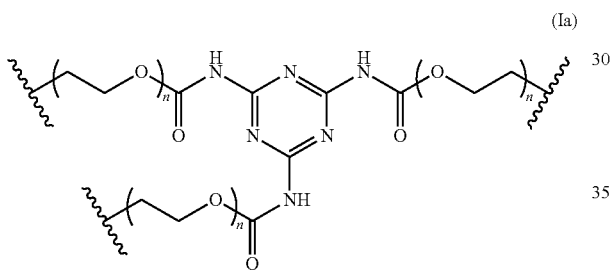

(Ia)

wherein each n is independently an integer between 1 and 100. In some embodiments, each n is independently an integer between 4 and 50. In some embodiments, each n is an integer between 4 and 20.

In some embodiments, the CO$_2$-philic photo-curable crosslinker that reacts with a telechelic PEG compound is a compound having the structure:

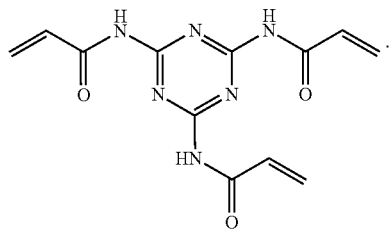 [SMILES: C=CC(=O)Nc1nc(NC(=O)C=C)nc(NC(=O)C=C)n1]

The telechelic PEG compound can be any PEG compound functionalized with one or more acrylate functional groups. In some embodiments, the telechelic PEG compound that reacts with the photo-curable crosslinker has an average molecular weight of about 200 g/mol to about 2000 g/mol. For example, the telechelic PEG compound can have an average molecular weight of about 200 to about 2000 g/mol, about 200 to about 1500 g/mol, about 200 to about 1200 g/mol, about 200 to about 1000 g/mol, about 200 to about 800 g/mol, about 200 to about 600 g/mol, about 200 to about 400 g/mol, about 300 to about 2000 g/mol, about 400 to about 2000 g/mol, about 600 to about 2000 g/mol, about 800 to about 2000 g/mol, about 1000 to about 2000 g/mol, about 1200 to about 2000 g/mol, about 400 to about 800 g/mol, about 300 to about 600 g/mol, about 600 to about 1200 g/mol, or about 600 to about 800 g/mol. In some embodiments, the average molecular weight of the telechelic PEG compound is about 200 g/mol, about 400 g/mol, about 600 g/mol, about 800 g/mol, about 1000 g/mol, about 1200 g/mol or about 2000 g/mol. In some embodiments, the average molecular weight of the telechelic PEG compound is about 480 g/mol. In some embodiments, the average molecular weight of the telechelic PEG compound is about 700 g/mol. In some embodiments, the telechelic PEG compound is PEGMEA 480. In some embodiments, the telechelic PEG compound is PEGDA 700. In some embodiments, the telechelic PEG compound is a combination of PEGMEA 480 and PEGDA 700.

In some embodiments, the telechelic PEG compound is a PEG acrylate compound. The PEG acrylate compound can be any PEG compound having one or more acrylate functional groups. In some embodiments, the PEG acrylate compound is a PEG-diacrylate (PEGDA) compound, a PEG-methyl ether acrylate (PEGMEA) compound, or combination thereof. In some embodiments, the PEG acrylate compound is a PEG-diacrylate (PEGDA) compound having the formula:

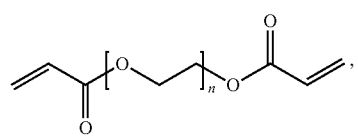

where n is an integer between 1 and 100. In some embodiments, the PEG acrylate compound is a PEG-methyl ether acrylate (PEGMEA) compound having the formula:

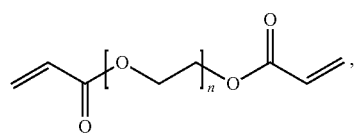

where n is an integer between 1 and 100.

In some embodiments, n is an integer between 1 and 100, such as between 1 and 75, between 1 and 50, between 1 and 25, between 1 and 15, between 1 and 10, between 4 and 50, between 4 and 20, between 10 and 40, between 10 and 25, between 20 and 30, between 10 and 15, or 1, 2, 3, 4, 5, 6, 7, 8, 9, 10, 11, 12, 13, 14, 15, 16, 17, 18, 19, 20, 25, 30, 35, 40, 45, or 50. In some embodiments, n is an integer between 4 and 50. In some embodiments, n is an integer between 1 and 25. In some embodiments, n is an integer between 4 and 20.

PEG Compounds Containing a Click Crosslinker

In some embodiments, the CO$_2$-philic click crosslinkers of the present disclosure are reacted with a telechelic PEG compound to form a CO$_2$-philic PEG compound incorporating the click crosslinker. In some embodiments, the CO$_2$-philic PEG compound is a compound of Formula (Ib):

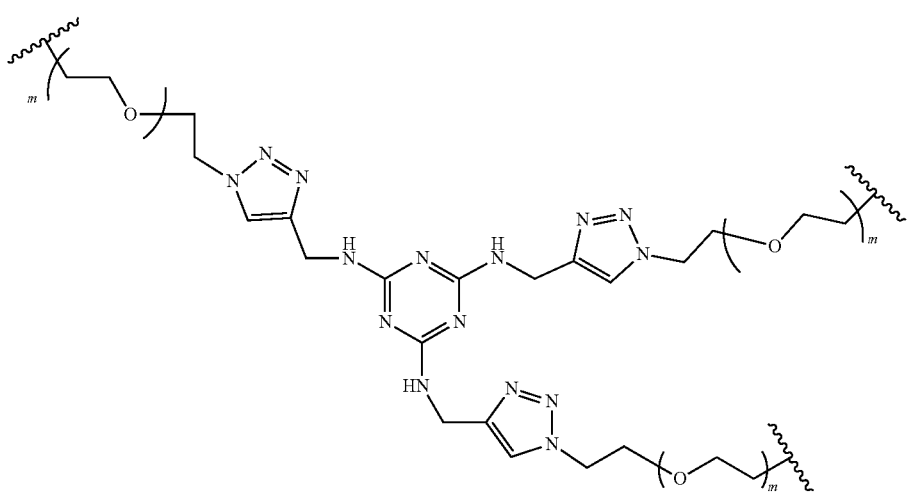

(Ib)

wherein each m is independently an integer between 1 and 100. In some embodiments, each m is independently an integer between 4 and 50. In some embodiments, each m is independently an integer between 4 and 20.

In some embodiments, the CO$_2$-philic click crosslinker reacted with a telechelic PEG compound is a compound having the structure:

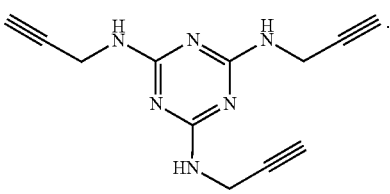 [SMILES: C#CCNc1nc(NCC#C)nc(NCC#C)n1]

The telechelic PEG compound can be any PEG compound functionalized with one or more azide functional groups. In some embodiments, the telechelic PEG compound that reacts with the click crosslinker has an average molecular weight of about 200 g/mol to about 2000 g/mol. For example, the telechelic PEG compound can have an average molecular weight of about 200 to about 2000 g/mol, about 200 to about 1500 g/mol, about 200 to about 1200 g/mol, about 200 to about 1000 g/mol, about 200 to about 800 g/mol, about 200 to about 600 g/mol, about 200 to about 400 g/mol, about 300 to about 2000 g/mol, about 400 to about 2000 g/mol, about 600 to about 2000 g/mol, about 800 to about 2000 g/mol, about 1000 to about 2000 g/mol, about 1200 to about 2000 g/mol, about 400 to about 800 g/mol, about 300 to about 600 g/mol, about 600 to about 1200 g/mol, or about 600 to about 800 g/mol. In some embodiments, the average molecular weight of the telechelic PEG compound is about 200 g/mol, about 400 g/mol, about 600 g/mol, about 800 g/mol, about 1000 g/mol, about 1100 g/mol, about 1200 g/mol, or about 2000 g/mol. In some embodiments, the average molecular weight of the telechelic PEG compound is about 1100 g/mol. In some embodiments, the telechelic PEG compound is PEG bis(azide) 1100.

In some embodiments, the telechelic PEG compound is a PEG azide compound. The PEG azide compound can be any PEG compound having one or more azide functional groups. In some embodiments, the PEG azide compound is a PEG bis(azide). In some embodiments, the PEG azide compound is a PEG bis(azide) compound having the formula:

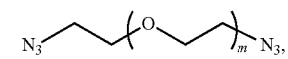

where m is an integer between 1 and 100.

In some embodiments, m is an integer between 1 and 100, such as between 1 and 75, between 1 and 50, between 1 and 25, between 1 and 15, between 1 and 10, between 5 and 50, between 10 and 40, between 10 and 25, between 20 and 30, between 10 and 15, or 1, 2, 3, 4, 5, 6, 7, 8, 9, 10, 11, 12, 13, 14, 15, 16, 17, 18, 19, 20, 25, 30, 35, 40, 45, or 50. In some embodiments, m is an integer between 4 and 50. In some embodiments, m is an integer between 1 and 25. In some embodiments, m is an integer between 4 and 20.

In some embodiments, the PEG bis(azide) compound has a molecular weight of about 200 to about 2000 g/mol, about 200 to about 1500 g/mol, about 200 to about 1200 g/mol, about 200 to about 1000 g/mol, about 200 to about 800 g/mol, about 200 to about 600 g/mol, about 200 to about 400 g/mol, about 300 to about 2000 g/mol, about 400 to about 2000 g/mol, about 600 to about 2000 g/mol, about 800 to about 2000 g/mol, about 1000 to about 2000 g/mol, about 1200 to about 2000 g/mol, about 400 to about 800 g/mol, about 300 to about 600 g/mol, about 600 to about 1200 g/mol, or about 600 to about 800 g/mol. In some embodiments, the average molecular weight of the PEG bis(azide) compound is about 200 g/mol, about 400 g/mol, about 600 g/mol, about 800 g/mol, about 1000 g/mol, about 1100 g/mol, about 1200 g/mol, or about 2000 g/mol. In some embodiments, the average molecular weight of the PEG bis(azide) compound is about 1100 g/mol. In some embodiments, the telechelic PEG compound is PEG bis(azide) 1100.

In some embodiments, the PEG bis(azide) is obtained via Mitsunobu functionalization of alcohol-terminated PEG by reaction of PEG with diphenylphosphoryl azide (DPPA) and diisopropyl azodicarboxylate (DIAD).

Methods of Preparing the CO$_2$-Philic Membranes

Also provided in the present disclosure are methods of preparing the PEG membranes of the present disclosure that contain a CO$_2$-philic PEG compound. The methods include reacting a telechelic PEG compound with a $CO_2$-philic melamine-based crosslinker of the present disclosure to form a crosslinked $CO_2$-philic PEG compound, and obtaining a $CO_2$-philic crosslinked PEG membrane.

In some embodiments, the $CO_2$-philic PEG membrane is prepared by reacting a PEG acrylate compound with a $CO_2$-philic melamine-based crosslinker in the presence of a photocrosslinking initiator. In some embodiments, the method further includes curing the resulting mixture under UV irradiation to form a membrane. In some embodiments, the PEG acrylate compound is a PEG-diacrylate (PEGDA) compound, a PEG-methyl ether acrylate (PEGMEA) compound, or combination thereof. In some embodiments, the PEGDA compound is a compound as described in the present disclosure. In some embodiments, the PEGMEA compound is a compound as described in the present disclosure. In some embodiments, the $CO_2$-philic melamine-based crosslinker is a photo-curable crosslinker, such as a photo-curable crosslinker of the present disclosure. In some embodiments, the photo-curable crosslinker is a compound having the

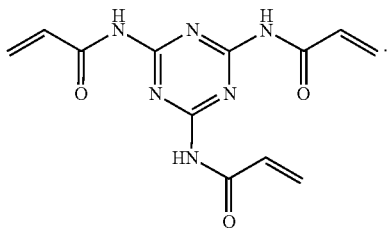 [SMILES: C=CC(=O)Nc1nc(NC(=O)C=C)nc(NC(=O)C=C)n1]

In some embodiments, the $CO_2$-philic membrane is prepared by reacting a PEG azide compound with a melamine-based crosslinker in the presence of a copper catalyst. In some embodiments, the method further includes drying the mixture containing the PEG azide compound, crosslinker, and catalyst to form a membrane. In some embodiments, the PEG azide compound is a PEG bis(azide) compound. In some embodiments, the PEG azide compound is a compound as described in the present disclosure. In some embodiments, the $CO_2$-philic melamine-based crosslinker is a click crosslinker, such as a click crosslinker of the present disclosure. In some embodiments, the click crosslinker is a compound having the formula:

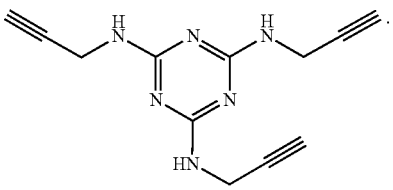 [SMILES: C#CCNc1nc(NCC#C)nc(NCC#C)n1]

In Some Embodiments, High Loading of the Click Crosslinker Results in Undesirable crystalline formation of the crosslinker. Thus, in some embodiments, secondary crosslinkers are utilized to prevent crystalline formation. In some embodiments, the secondary crosslinker is a PEG bis(azide). In some embodiments, the secondary crosslinker is a PEG bis(azide) with a molecular weight of about 150 to about 350, about 200 to about 300, or about 250. In some embodiments, the secondary crosslinker is 1,11-diazido-3,6,9-trioxaundecane. In some embodiments, the secondary cross-linker is added in an amount of about 10 mol % to about 35 mol %, such as about 15 mol % to about 30 mol %, about 20 mol % to about 30 mol %, or about 25 mol % relative to the crosslinker. In some embodiments, a linker with orthogonal reactivity to the alkyne-azide system that independently performs initial functionalization of PEG with the click crosslinker followed by crosslinking of the telechelic polymer is introduced. In some embodiments, undesirable crystalline formation is prevented by applying heat during membrane formation.

Methods of Improving Membrane $CO_2$ and $H_2S$ Transport Properties

The $CO_2$-philic crosslinked PEG membranes of the present disclosure have improved transport properties as compared to PEG membranes that do not contain the $CO_2$-philic PEG compounds of the present disclosure. The $CO_2$-philic crosslinked PEG membranes of the present disclosure also have improved transport properties as compared to cellulose acetate (CA) membranes, which are widely used in natural gas separations. The improved properties are due to the incorporation of the highly $CO_2$-philic melamine-based crosslinkers of the present disclosure into the PEG membrane. The $CO_2$-philic crosslinkers favorably interact with both acid and sour gases ($CO_2$ and $H_2S$).

In some embodiments, the membranes exhibit a $CO_2$-permeability increase as compared to a membrane that does not contain the $CO_2$-philic PEG compound. In some embodiments, the membranes exhibit a $CO_2$-permeability increase of up to about 4,000% or more, or about 1,000% to about 4,000% or more as compared to a membrane that does not contain the $CO_2$-philic PEG compound, such as about 2,000% to about 4,000%, about 2,000% to about 3,500%, about 2,000% to about 3,000%, about 2,000% to about 2,500%, or about 3,000% to about 4,000%, or more. For example, the membranes exhibit a $CO_2$-permeability increase of about 1,000%, about 1,500%, about 2,000%, about 2,500%, about 3,000%, about 3,500%, about 4,000%, or more as compared to a membrane that does not contain the $CO_2$-philic PEG compound. Thus, provided in the present disclosure are methods of using the membranes of the present disclosure to increase $CO_2$-permeability as compared to a membrane that does not contain the $CO_2$-philic PEG compound.

In some embodiments, the membranes exhibit a $H_2S$-permeability increase as compared to a membrane that does not contain the $CO_2$-philic PEG compound. In some embodiments, the membranes exhibit a $H_2S$-permeability increase of up to about 4,000% or more, or about 1,000% to about 4,000% or more as compared to a membrane that does not contain the $CO_2$-philic PEG compound, such as about 2,000% to about 4,000%, about 2,000% to about 3,500%, about 2,000% to about 3,000%, about 2,000% to about 2,500%, or about 3,000% to about 4,000%, or more. For example, the membranes exhibit a $H_2S$-permeability increase of about 1,000%, about 1,500%, about 2,000%, about 2,500%, about 3,000%, about 3,500%, about 4,000%, or more as compared to a membrane that does not contain the $CO_2$-philic PEG compound. Thus, provided in the present disclosure are methods of using the membranes of the present disclosure to increase $H_2S$-permeability as compared to a membrane that does not contain the $CO_2$-philic PEG compound.

In some embodiments, the membranes exhibit a $H_2S$-permeability increase as compared to a cellulose acetate (CA) membrane. In some embodiments, the membranes exhibit a $H_2S$-permeability increase of up to about 20,000% or more, or about 15,000% to about 20,000% or more as compared to a CA membrane, such as about 1,000% to about 20,000%, about 2,000% to about 18,000%, about 5,000% to about 15,000%, or about 10,000% to about 20,000%, or about 15,000% to about 20,000% or more. For example, the membranes exhibit a $H_2S$-permeability increase of about 1,000%, about 5,000%, about 10,000%, about 15,000%, about 16,000%, about 17,000%, about 18,000%, about 19,000%, about 20,000%, or more as compared to a CA membrane. Thus, provided in the present disclosure are methods of using the membranes of the present disclosure to increase $H_2S$-permeability as compared to a CA membrane that does not contain the $CO_2$-philic PEG compound.

In some embodiments, the membranes exhibit a $H_2S/CH_4$ selectivity increase as compared to a membrane that does not contain the $CO_2$-philic PEG compound. In some embodiments, the membranes exhibit a $H_2S/CH_4$ selectivity increase of up to about 500% or more, or about 10% to about 100%, or about 30% to about 60% as compared to a membrane that does not contain the $CO_2$-philic PEG compound, such as about 10% to about 80%, about 20% to about 70%, about 30% to about 60%, or about 40% to about 100%. For example, the membranes exhibit a $H_2S/CH_4$ selectivity increase of about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, or more, as compared to a membrane that does not contain the $CO_2$-philic PEG compound. Thus, provided in the present disclosure are methods of using the membranes of the present disclosure to increase $H_2S/CH_4$ selectivity as compared to a membrane that does not contain the $CO_2$-philic PEG compound.

In some embodiments, the membranes exhibit a $H_2S/CH_4$ selectivity increase as compared to a cellulose acetate (CA) membrane. In some embodiments, the membranes exhibit a $H_2S/CH_4$ selectivity increase of up to about 500% or more, or about 100% to about 500%, or about 200% to about 400% as compared to a CA membrane, such as about 100% to about 400%, about 200% to about 300%, about 300% to about 350%, or about 400% to about 500%. For example, the membranes exhibit a $H_2S/CH_4$ selectivity increase of about 100%, about 150%, about 200%, about 250%, about 300%, about 350%, about 400%, about 450%, about 500%, or more, as compared to a CA membrane. Thus, provided in the present disclosure are methods of using the membranes of the present disclosure to increase $H_2S/CH_4$ selectivity as compared to a CA membrane that does not contain the $CO_2$-philic PEG compound.

In some embodiments, increased loading of the crosslinker enhances $CO_2$ selectivity while maintaining a sufficiently crosslinked network.

Also provided in the present disclosure are methods of separating $CO_2$ and $H_2S$ from natural gas. In some embodiments, the method includes:

providing a $CO_2$-philic membrane comprising a $CO_2$-philic polyethylene glycol (PEG) compound of Formula (I):

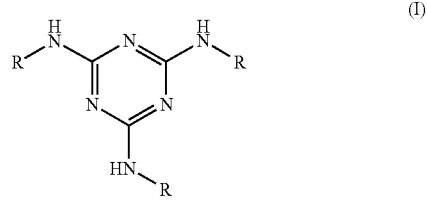

(I)

wherein:
R is selected from:

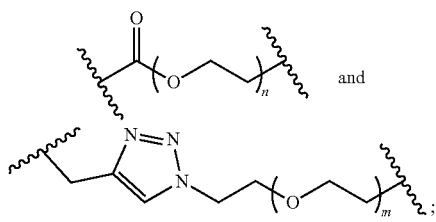

each n is independently an integer between 1 and 100; and
each m is independently an integer between 1 and 100;
introducing a natural gas stream to the membrane; and
removing $CO_2$ and $H_2S$ from the natural gas.

In some embodiments of the method, the compound of Formula (I) is selected from:

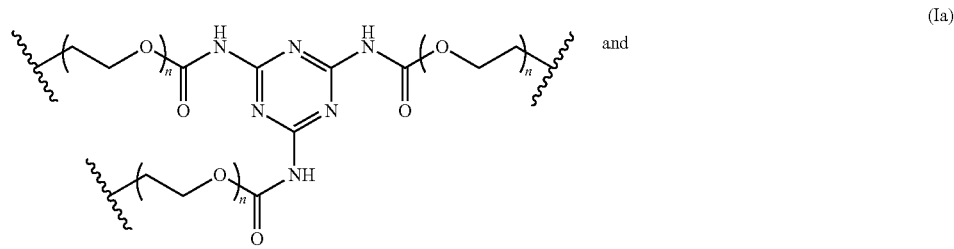

(Ia)

and

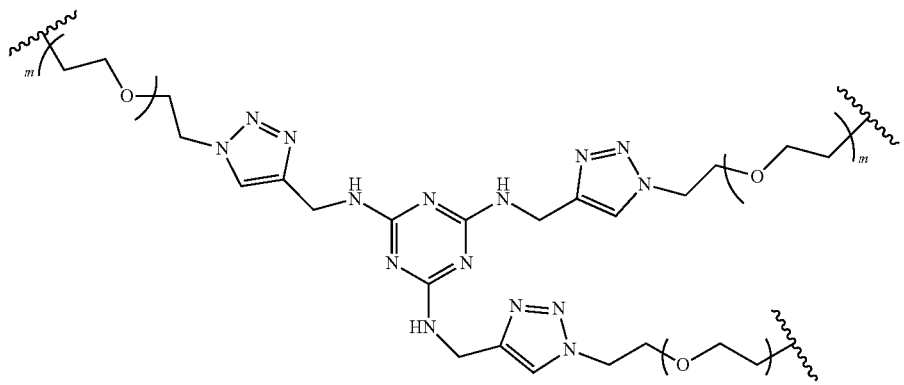

(Ib)

wherein:
each n is independently an integer between 1 and 100; and
each m is independently an integer between 1 and 100.

In some embodiments of the method, the compound of Formula (I) is a compound of Formula (Ia) and each n is independently an integer between 1 and 50. In some embodiments of the method, the compound of Formula (I) is a compound of Formula (Ia) and each n is independently an integer between 1 and 25. In some embodiments of the method, the compound of Formula (I) is a compound of Formula (Ia) and each n is independently an integer between 4 and 50. In some embodiments of the method, the compound of Formula (I) is a compound of Formula (Ia) and each n is independently an integer between 4 and 20.

In some embodiments of the method, the compound of Formula (I) is a compound of Formula (Ib) and each m is independently an integer between 1 and 50. In some embodiments of the method, the compound of Formula (I) is a compound of Formula (Ib) and each m is independently an integer between 1 and 25. In some embodiments of the method, the compound of Formula (I) is a compound of Formula (Ib) and each m is independently an integer between 4 and 50. In some embodiments of the method, the compound of Formula (I) is a compound of Formula (Ib) and each m is independently an integer between 4 and 20.

Figure 2:
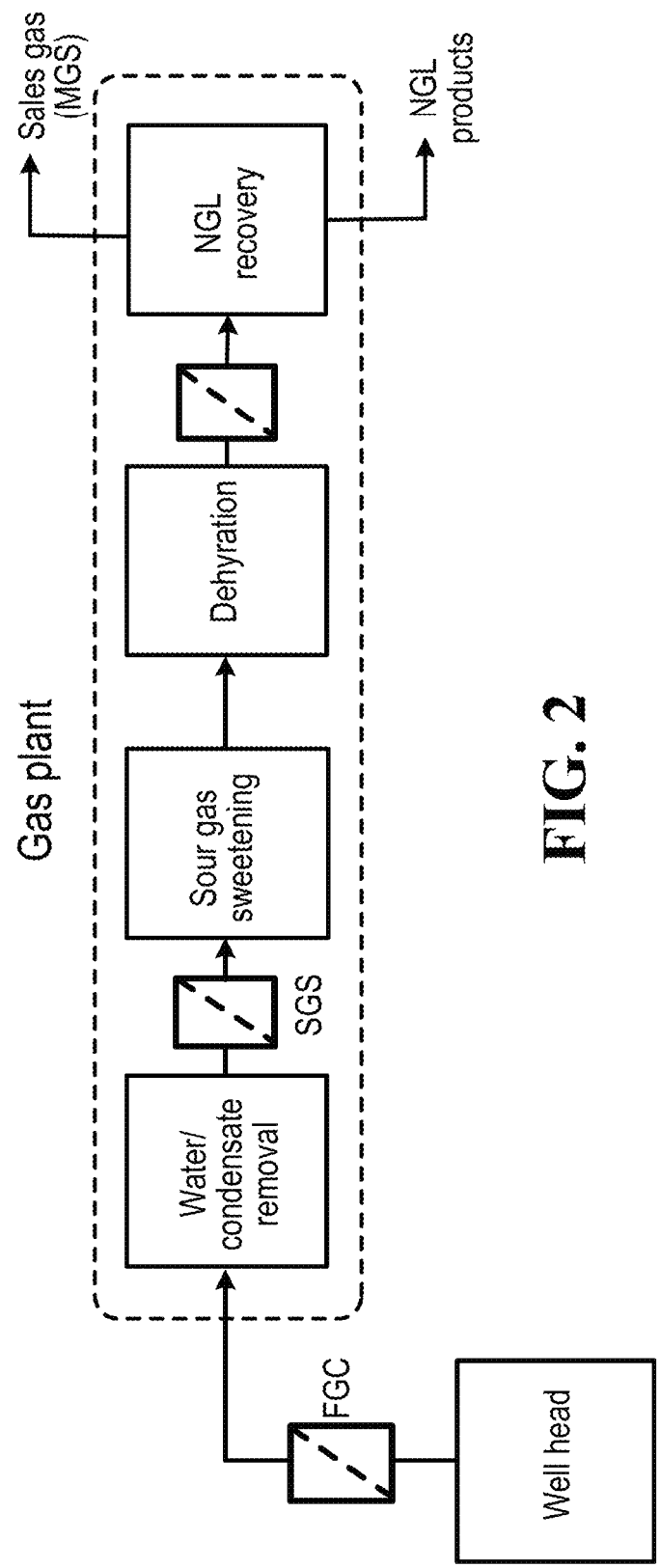
FIG. 2 shows membrane unit operations in a gas processing plant including fuel gas conditioning (FGC), sour gas separations (SGS), and natural gas liquid separations (NGL).

The membranes of the present disclosure can be used in any gas processing plant. In some embodiments, the membranes are used in a gas processing plant that includes one or more of fuel gas conditioning (FGC), sour gas separation (SGS), and natural gas liquid separations (NGL). FIG. 2 illustrates an exemplary membrane unit in a gas processing plant in which the membranes of the present disclosure can be utilized. As shown in the membrane unit operation of FIG. 2, a highly pressurized natural gas stream is being treated to remove contaminants from the desired natural gas product (often $CH_4$). The removal of different gas contaminants typically requires different membranes. The membranes of the present disclosure, however, can be used to simultaneously separate $CO_2$ (acid gas) and $H_2S$ (sour gas) from natural gas, without requiring the use of separate membranes for each contaminant.

EXAMPLES

Example 1—Preparation of Photo-Curable Crosslinker

Materials used: Melamine (Acros, 99%, lot: A037043, pure by $^1$H-NMR); acryloyl chloride (freshly distilled and stored under argon); NMP.

A photo-curable crosslinker (1) was prepared according to Scheme 1.

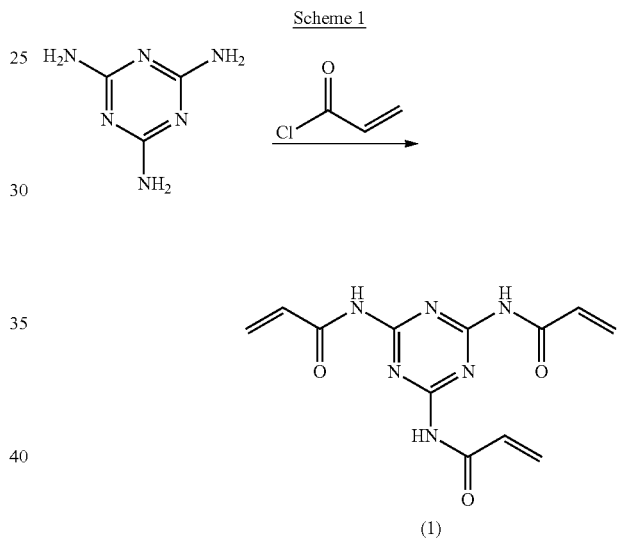

Figure 3:
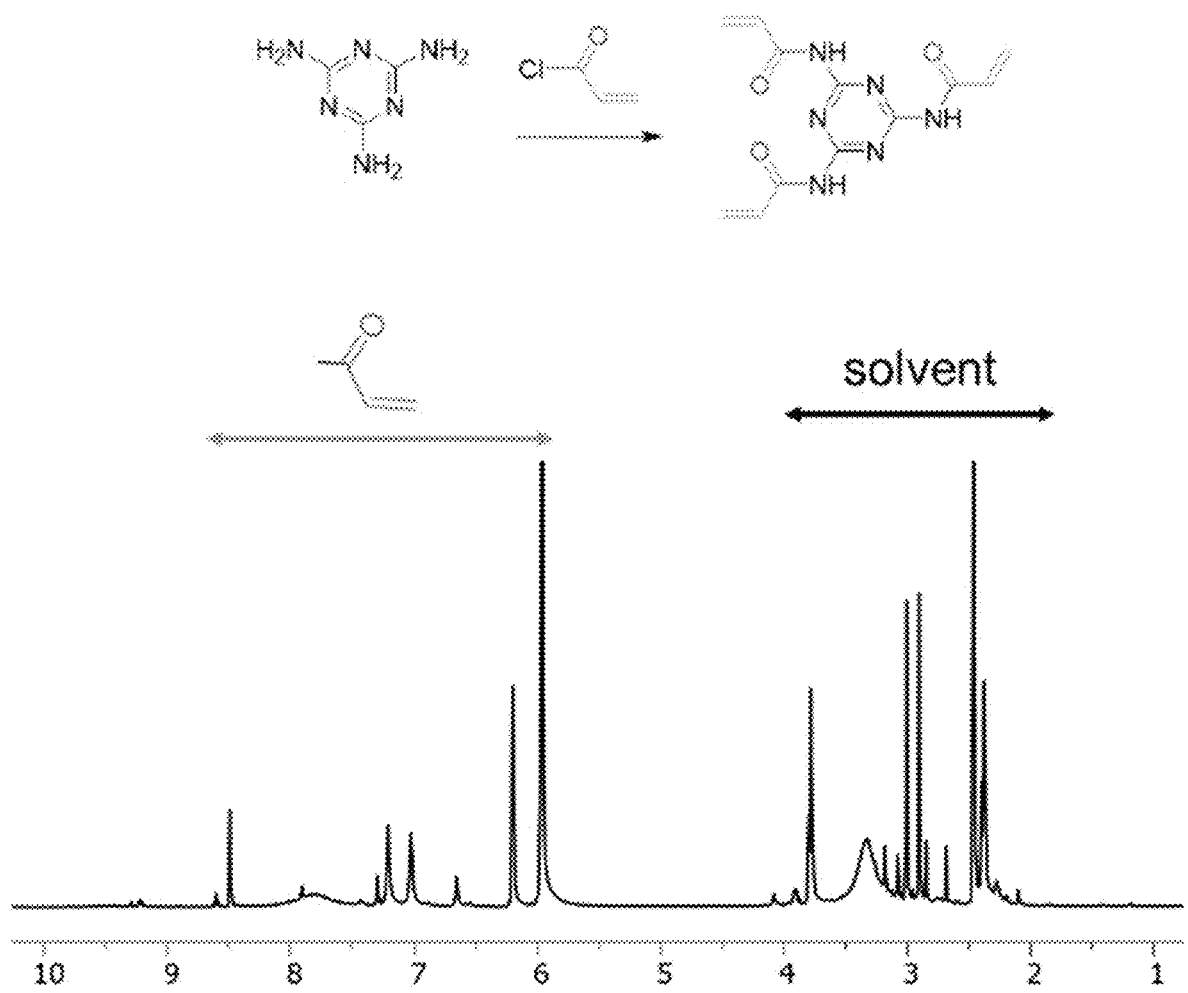
FIG. 3 is the $^1H$ NMR spectra in DMSO of the photo-curable acrylamide-melamine crosslinker (1) with residual solvent.

Briefly, melamine was added to 25 mL of dry NMP in a dried 250 mL 3-necked flask, sealed with septum, and a light nitrogen purge was started. The reaction mixture was heated to near 120° C. to dissolve most of the melamine. Triethylamine was added and the reaction was cooled to 0° C. while stirring. Acryloyl chloride was added slowly over a period of 2 hours using a syringe pump. The reaction was kept at 0° C. for 6+ hours. An additional 75 mL of dry NMP was added to promote solubility and the reaction stirred overnight at rt. The precipitate was then removed via filtration and diluted with THF. A hot saturated NaCl aqueous solution was added, causing more precipitate to form. After sitting for several days, a solid had settled out of solution and was filtered. THF was removed via distillation. The remaining solid was diluted with 200 mL toluene and stirred. The solid product was removed via filtration. The toluene and NMP were removed via distillation, resulting in a sticky orange oil that was the acrylamide-functionalized melamine photo-curable crosslinker (1). The $^1$H NMR spectra of crosslinker (1) in DMSO is shown in FIG. 3. Successful acrylate functionalization was observed in the indicated downfield region.

Example 2—Preparation of Crosslinked PEG Compound Containing a Photo-Curable Crosslinker The photo-curable crosslinker (1) prepared in Example 1 was used to prepare a crosslinked PEG compound by crosslinking PEG via UV irradiation according to a method adapted from Lin et al., "Plasticization-Enhanced Hydrogen Purification Using Polymeric Membranes," Science, 311 (5761):639 (2006) and shown in Scheme 2.

mers) and the photocrosslinked PEG compound (3) containing 25% $CO_2$-philic allyl melamine with acrylate-based monomers. Evidence of successful PEGMEA and PEGDA crosslinking can be seen in the spectra, which showed a signature C=C stretch at about 810 cm$^{-1}$ (region 5 in FIG. 5) and C=C—C=O carbonyl at 1192 cm$^{-1}$ present in the monomers but absent in the polymers. Incorporation of allyl melamine was evidenced by a peak at 975 cm$^{-1}$ in the monomer that disappeared in the polymer (region 4 in FIG.

Scheme 2

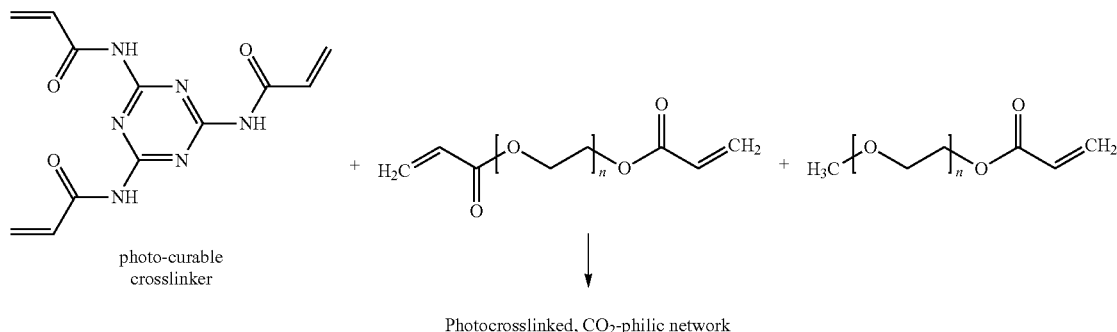

Photocrosslinked, $CO_2$-philic network

Materials used: Polyethylene glycol methyl ether acrylate (480 Mn, from Aldrich, Lot #MKBS3561V); polyethylene glycol diacrylate (700 Mn, from Aldrich, Lot #MKBV7610V); acrylamide functionalized melamine crosslinker (1) (crude product from Example 1 (solid after sodium bicarb wash and dry)); both PEG reagents were stored in fridge under Ar gas; 1-hydroxylcyclohexyl phenyl ketone (HCPK) from Aldrich.

Briefly, 1.25 g of the PEG methyl ether acrylate (25 wt %), 1.25 g of the acrylamide melamine and 2.5 g of the PEG diacrylate (50 wt %) were added to a small vial and rolled under low heat under all mixed/dissolved. 0.005 g of the HCPK solid was added to the PEG mixture, followed by 4 mL of DMSO to dissolve crosslinker (1). After allowing the crosslinker to dissolve, the solution was filtered via syringe filters and crosslinked via UV. Photocrosslinked PEG compound (2) formed as a rubbery light brown film and was dried overnight at 120° C. to remove residual DMSO. The final PEG membrane (2) contained 25% $CO_2$-philic allyl melamine with acrylate based monomers.

Figure 4:
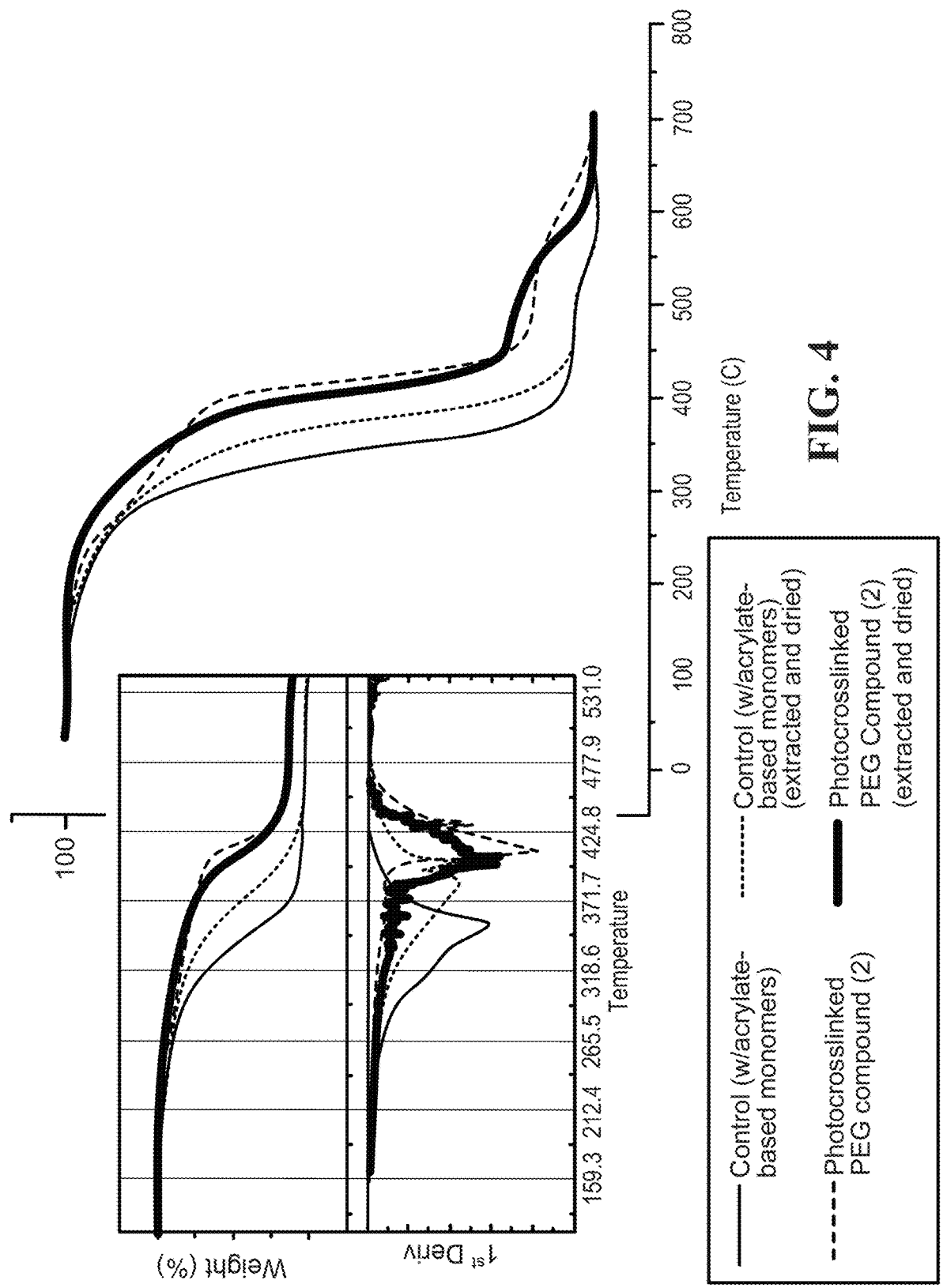
FIG. 4 is a TGA thermogram of a photocrosslinked PEG compound containing the acrylate-functionalized melamine-based crosslinker (1) and a comparative photocrosslinked PEG compound containing acrylate-based monomers.

FIG. 4 shows a TGA thermogram of the photocrosslinked PEG compound (2) containing the acrylate-functionalized melamine-based crosslinker (1). A comparative photocrosslinked PEG compound containing acrylate-based monomers was also prepared and compared to the photocrosslinked PEG compound (2). Dried PEG compound (2) had a rapid weight loss 1$^{st}$ derivative max at about 400-405° C. and was thermally stable until past 200° C. with 90% weight remaining at around 280° C. Thermal degradation was intermediate between the monomers PEGDA (1$^{st}$ derivative weight loss max at 415° C.), PEGMEA (1$^{st}$ derivative weight loss max at 265° C.) and allyl melamine (1$^{st}$ derivative weight loss max at 265° C.). The comparative PEG compound did not exhibit large weight loss derivatives that overlapped with allyl melamine and PEGMEA (there is a slight one), indicating incorporation of melamine photocrosslinker into the compound.

Figure 5:
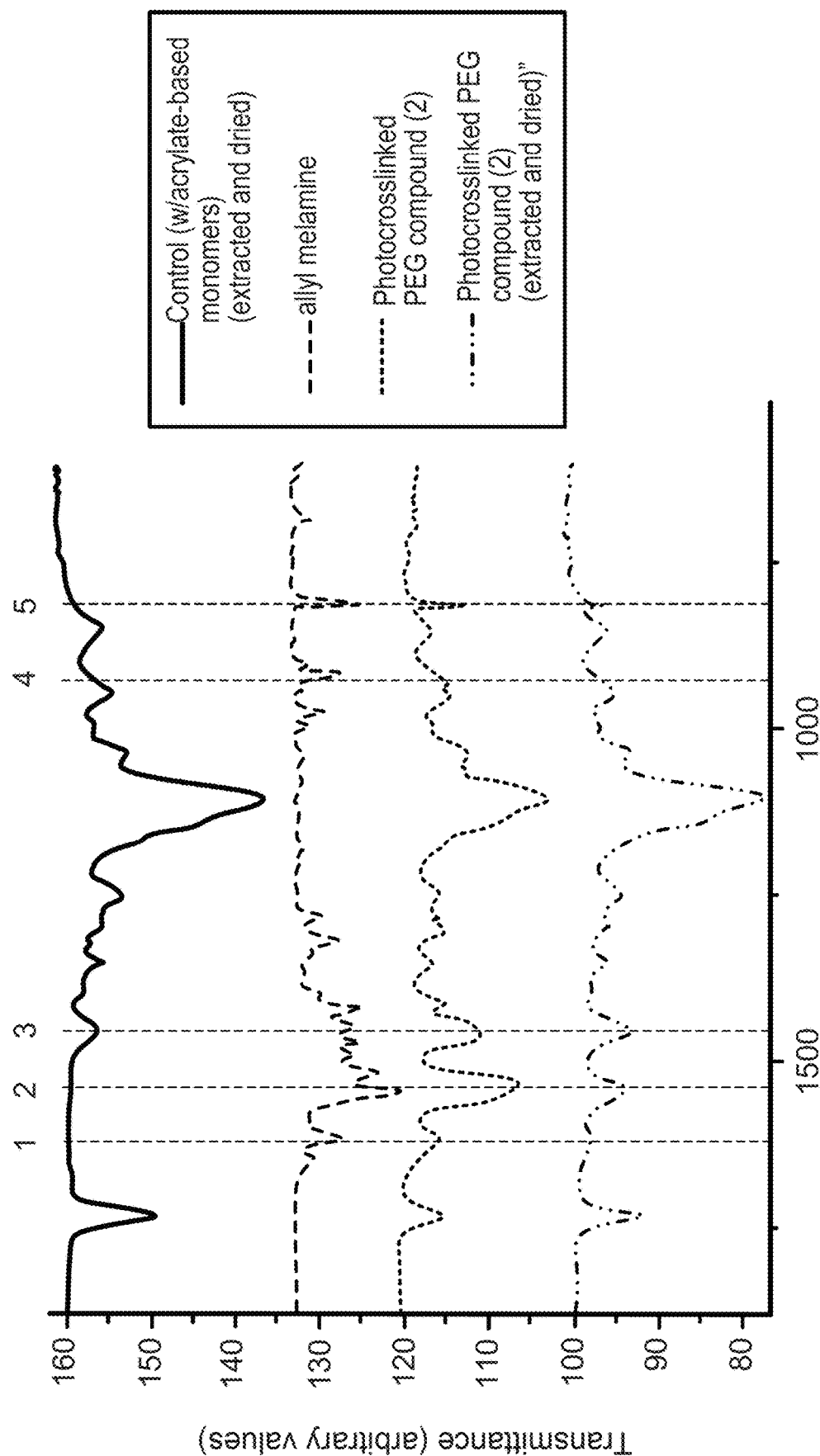
FIG. 5 is an FTIR comparison of a photocrosslinked PEG compound containing the acrylate-functionalized melamine-based crosslinker (1) and a comparative photocrosslinked PEG compound containing acrylate-based monomers.

FIG. 5 is an FTIR comparison of the comparative photocrosslinked PEG compound (with acrylate based mono- 5). The strong peak at 814 cm$^{-1}$ likely indicates residual allyl groups. The disappearance of the peak in the 966 cm$^{-1}$ region indicated disappearance of the propenyl group after UV irradiation (see Yin et al., Journal of Polymer Science: Polymer Chemistry, 2016). The peak at 972 cm$^{-1}$ was almost eliminated from allyl melamine after UV irradiation, which may indicate allyl reaction. The FTIR spectra looked similar between the neat sample of the photocrosslinked PEG compound (2) and the extracted photocrosslinked PEG compound (2), though some allyl melamine content was reduced in the extracted sample. Peaks at ~1675 cm$^{-1}$, ~1450 cm$^{-1}$, ~900 cm$^{-1}$, and ~800 cm$^{-1}$ from the melamine reagent (1) all decreased compared to the neat (2); however, the strong presence of a peak at ~1550 cm$^{-1}$ showed that there was still a substantial amount of allyl melamine inside the network.

Example 3—Preparation of Click Crosslinker

A click crosslinker was prepared according to a procedure adapted from Guo et al., "Rhodium Nanoflowers Stabilized by a Nitrogen-Rich PEG-Tagged Substrate as Recyclable Catalyst for the Stereoselective Hydrosilylation of Internal Alkynes," Adv. Synth. Catal., 357:89-99 (2015) and shown in Scheme 3.

Scheme 3

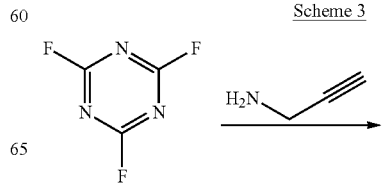

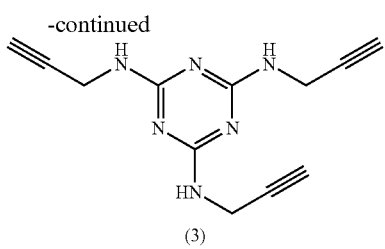

(3)

Figure 6:
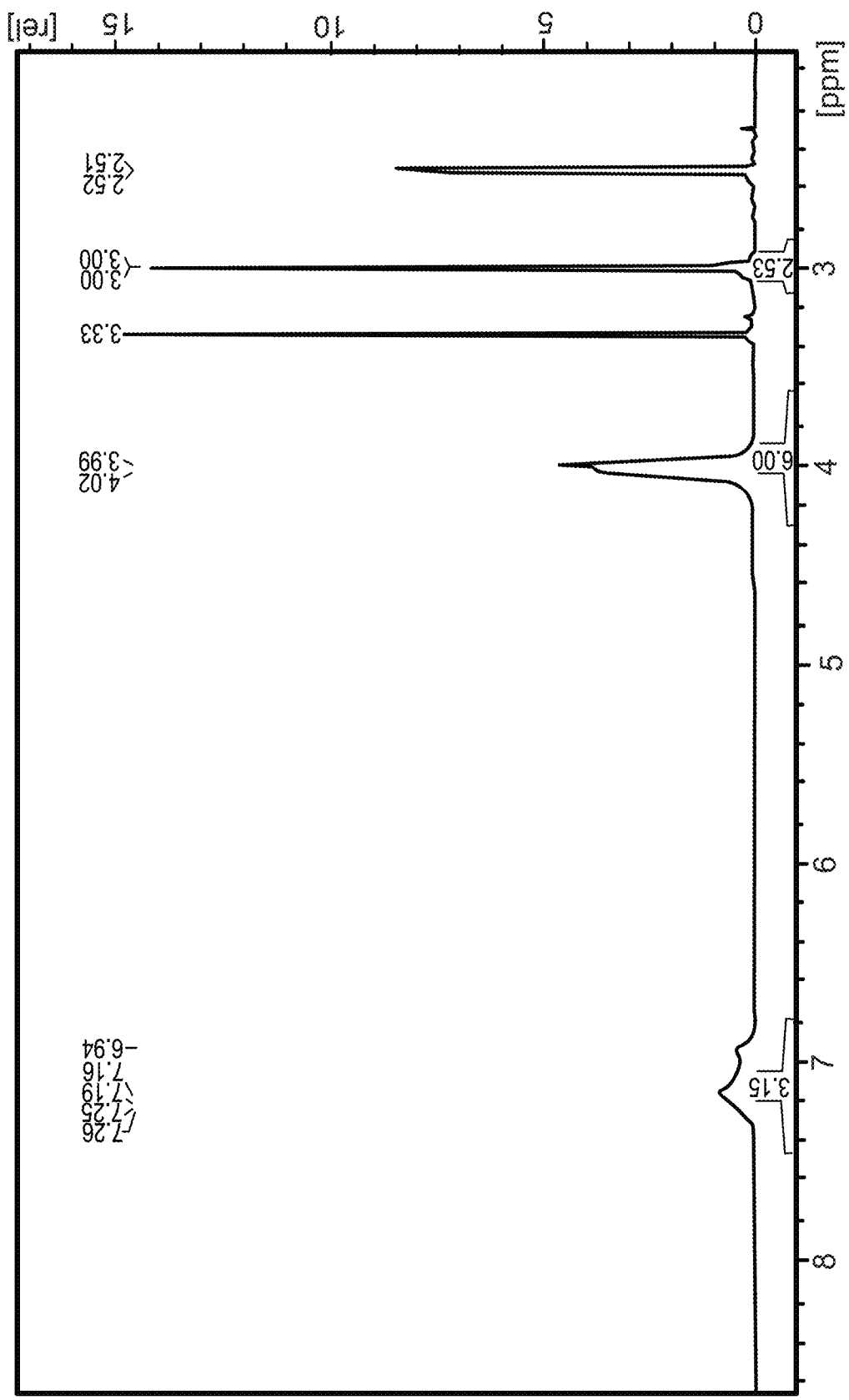
FIG. 6 is the $^1H$ NMR spectra in DMSO of the click crosslinker (3).

To an oven-dry and flame-dried 250 mL 2-neck flask with condenser under air-free conditions (evacuated and refilled with Ar 3×) was added 60 mL anhydrous toluene. 0.95 mL cyanuric fluoride was then added via syringe. 4.25 mL propargylamine was added to the clear, stirring mixture at RT dropwise (5 min). Gas generation and development of a pale yellow precipitate occurred immediately upon addition. The mixture stirred at reflux for 18 hrs overnight on a hot plate with solid heating blocks set to 200° C. and a flask wrapped in foil to achieve gentle reflux. After 17 hrs, the mixture had changed from heterogeneous pale yellow to red flowing precipitate. Cooling to RT yielded a color change to yellow precipitate. Heating again to reflux turned the mixture back to red flowing precipitate. At 18 hrs, the mixture showed a single product spot by TLC $R_f$=0.27 (1:1 EtOAc: hexane, vis by UV). Hot filtration was performed on the mixture at reflux and the red filter cake was washed with hot toluene. The yellow filtrate cooled to RT, resulting in crystallization of a colorless precipitate. Further precipitation occurred upon cooling in an ice bath. A white precipitate was collected by filtration, washed with ice cold toluene, and dried over high vacuum for 2 hrs. A second crop of crystals formed after filtration, and was collected in a separate step as a second crop. 1.523 g of the click crosslinker (3) was collected between two crops in 68% final yield. The $^1$H NMR spectra of the click crosslinker (3) in DMSO is shown in FIG. 6.

$^1$H NMR (500 MHz, DMSO) δ: 7.26-6.94 (m, 3H), 4.00 (s, 6H), 3.00 (s, 3H).

$^{13}$C NMR (125 MHz, DMSO) δ: 165.8, 82.8, 72.7, 29.7.

Example 4—Preparation of Crosslinked PEG Compound Containing Click Crosslinker

The click crosslinker (3) prepared in Example 3 was crosslinked with bis-azide PEG (MW=1100) to from crosslinked PEG compound (4) using a copper(I)-catalyzed azide alkyne cycloaddition reaction (CuAAC) as shown in Scheme 4. The procedure was adapted from Chem. Commun., 2010, 46, 8416-8418 (cmpd 3e).

Scheme 4

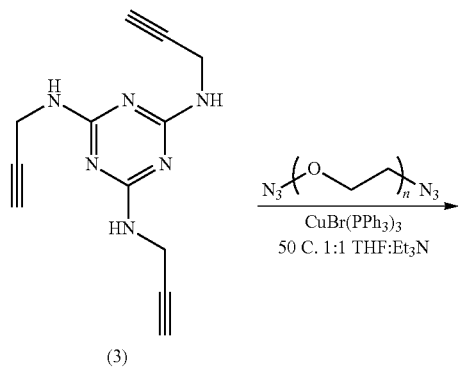

-continued

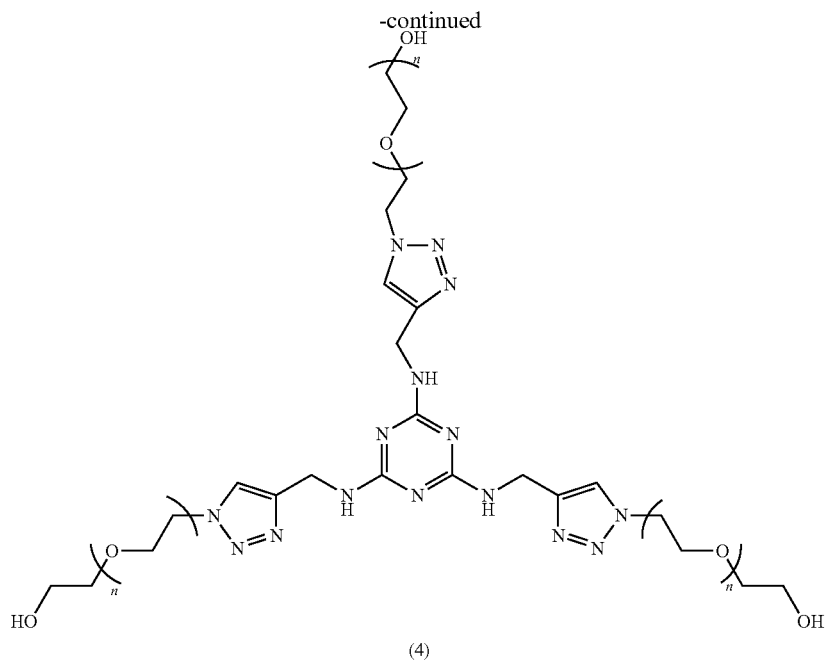

(4)

To an oven-dry 50 mL Schlenk flask under air-free conditions (argon), 0.025 g of the click crosslinker (3), 0.172 g of PEG-1000 azide, and 0.001 g of CuBr(PPh$_3$)$_3$ catalyst was added. The solids were dissolved in 5 mL anhydrous 1:1 (vol/vol) THF/TEA. The reaction mixture was stirred at 50° C. and monitored by TLC. After 15 min at 50° C., a white precipitate of interconnected flakes began forming. After 1 hour at 50 C, a significant amount of white precipitate had formed. After 16 hrs, there was no noticeable change in the amount of precipitate. The THF/TEA was removed by pipet. The white precipitate was rinsed with toluene, MeOH, and acetone to remove soluble impurities (the precipitate was insoluble in these solvents). The solid crosslinked PEG compound (4) was dried over high vacuum.

Figure 7:
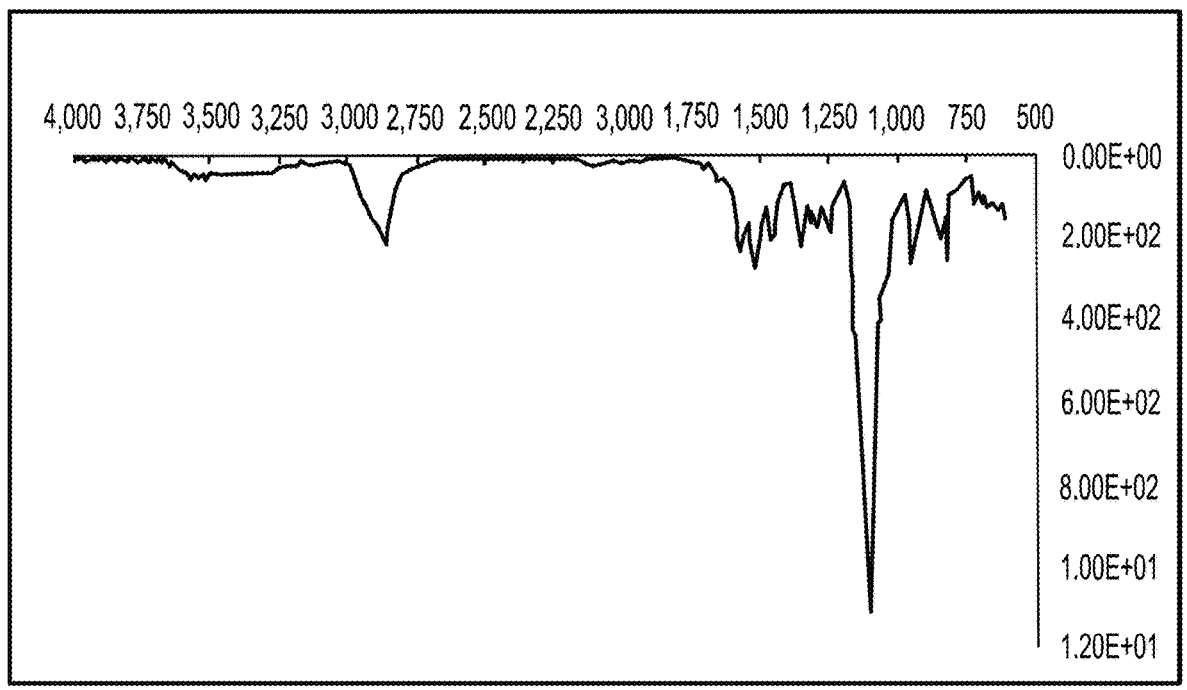
FIG. 7 is the FTIR spectra of the click crosslinked PEG compound (4).
Figure 8:
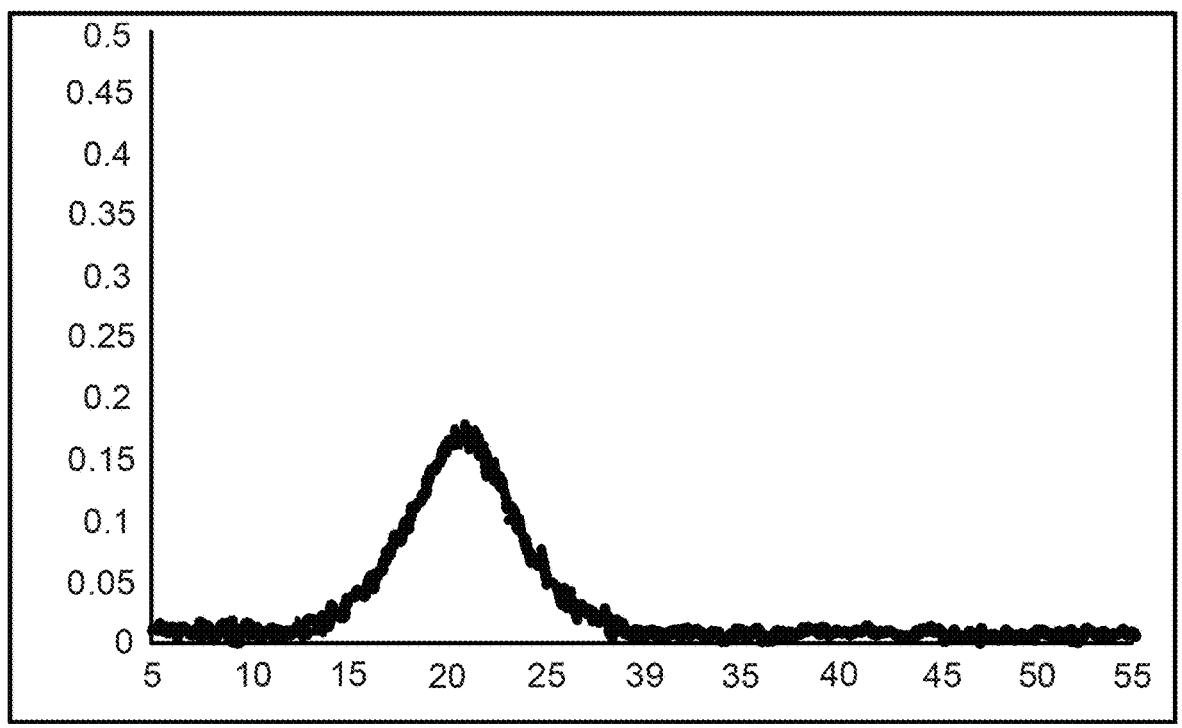
FIG. 8 is an XRD diffractogram of the click crosslinked PEG compound (4).
Figure 9:
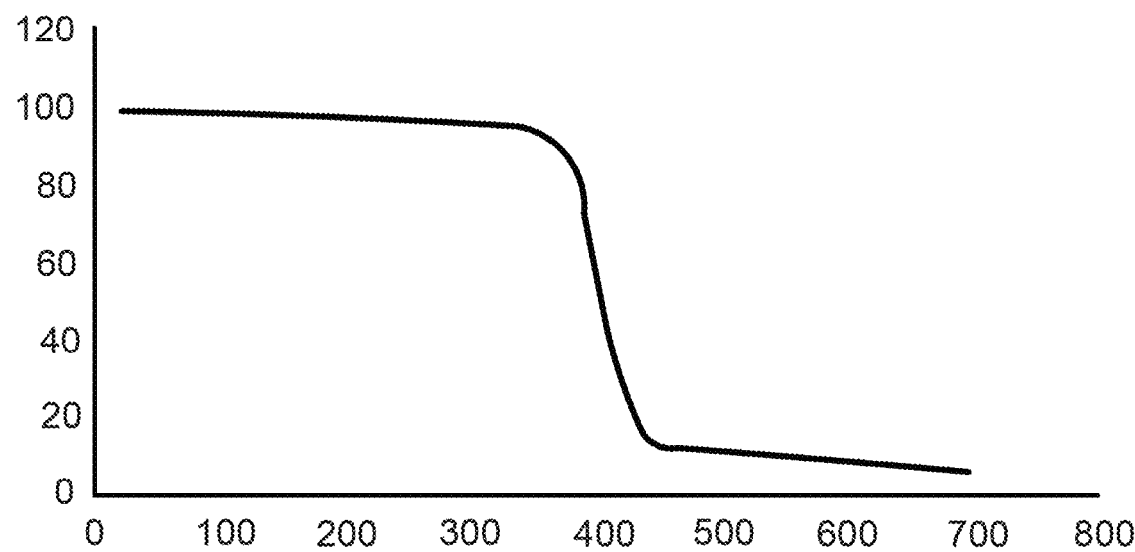
FIG. 9 is a TGA thermogram of the click crosslinked PEG compound (4).

FIG. 7 shows the FTIR spectra of the click crosslinked PEG compound (4), with strong indications of $CO_2$-philic melamine crosslinker (3) incorporation in the 1,250-1600 cm$^{-1}$ region. FIG. 8 is an XRD diffractogram of the click crosslinked PEG compound (4) containing the $CO_2$-philic click crosslinker (3). A broad amorphous peak of chain packing without any observed crystallinity was observed. The PEG compound contained 13.4% $CO_2$-philic crosslinker loading by weight. A TGA thermogram of the PEG compound (4) crosslinked with the $CO_2$-philic click crosslinker showed high thermal stability to 350-400° C. (FIG. 9).

Figure 10:
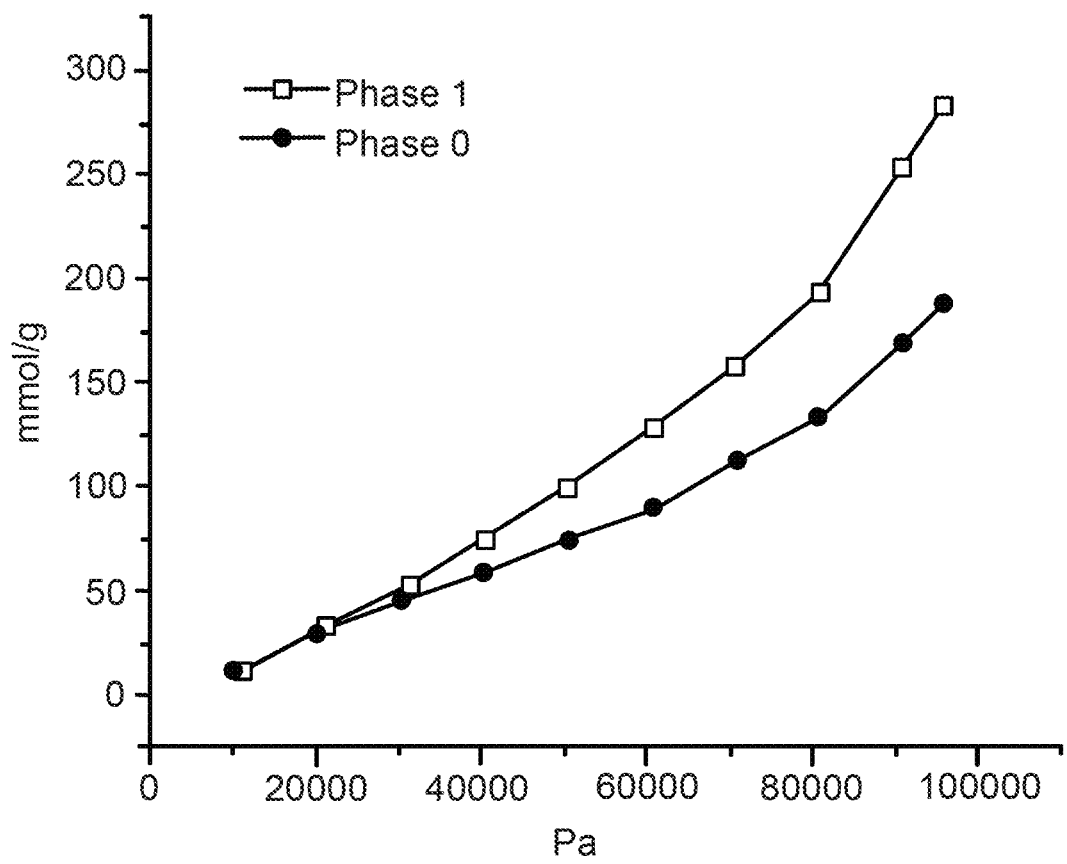
FIG. 10 shows the results of physiosorption testing of the click crosslinked PEG compound (4) as compared to a PEG compound without a $CO_2$-philic crosslinker.

Preliminary sorption testing of Phase 1 (PEG compound (4), containing the crosslinker (3)), vs Phase 0 (a PEG membrane without the crosslinker (3)) was conducted. The results are shown in Table 1. Initial physiosorption testing with $CO_2$ gave early evidence of successful incorporation of $CO_2$-philicity. As shown in FIG. 10, the Phase 1 sample with a $CO_2$-philic crosslinker (3) showed a >50% increase in $CO_2$ sorption at the highest pressures measured as compared to the Phase 0 sample of PEG crosslinked without a $CO_2$-philic crosslinker.

TABLE 1

| Phase 1 | | Phase 0 | |
|---|---|---|---|
| P/Pa | mmol/mg | P/Pa | mmol/mg |
| 11145.75 | 12.09821 | 10132.5 | 11.92411 |
| 21278.25 | 33.59821 | 20265 | 30.16071 |
| 31410.75 | 53.19196 | 30397.5 | 44.95089 |
| 40530 | 75.19196 | 40530 | 58.99554 |
| 50662.5 | 100.2366 | 50662.5 | 74.92857 |
| 60795 | 128.3929 | 60795 | 90.20536 |
| 70927.5 | 158.6652 | 70927.5 | 112.3616 |
| 81060 | 193.9464 | 81060 | 134.2277 |
| 91192.5 | 254.4152 | 91192.5 | 169.7277 |
| 96258.75 | 284.4777 | 96258.75 | 188.1696 |

Example 5—Preparation of Membrane Containing Click Crosslinked PEG Compound

A series of homogeneous film membranes containing the click crosslinked PEG compound (4) were prepared using either varying amounts of the copper catalyst CuBr(PPh$_3$)$_3$ and varying amounts of the click crosslinker (3) according to the following casting procedures.

2 Mol % Copper Catalyst

Membranes were prepared containing the components listed in Tables 2-4.

TABLE 2

| Reagent Name | Mol. Wt. | Eq. | Mol. | Measured | Unit |
|---|---|---|---|---|---|
| Click crosslinker (3) | 240.27 | 1.00 | 8.74E−05 | 0.021 | g |
| PEG-1000 azide | 1100 | 1.44 | 0.000125 | 0.138 | g |
| CuBr(PPh$_3$)$_3$ | 930.325 | 0.02 | 1.72E−06 | 0.0016 | g |
| THF/TEA | | | | 4 | mL |

In a 20 mL scintillation vial, click crosslinker (3) (1 eqv.) was dissolved in 2 mL 1:1 THF/TEA with 2 mol CuBr (PPh$_3$)$_3$ catalyst. In a second vial, PEG-1000 azide (1.44 eqv.) was dissolved in 2 mL THF/TEA. The PEG and crosslinker/catalyst solutions were mixed via injection over micro-filter in a small dish and evaporated under a large glass cover with an air-gap. A relatively homogeneous film formed overnight that was stretchy but tore easily.

TABLE 3

| Reagent Name | Mol. Wt. | Eq. | Mol. | Measured | Unit |
|---|---|---|---|---|---|
| Click crosslinker (3) | 240.27 | 1.00 | 0.000125 | 0.030 | g |
| PEG-1000 azide | 1100 | 1.41 | 0.000176 | 0.194 | g |
| CuBr(PPh$_3$)$_3$ | 930.325 | 0.02 | 2.9E-06 | 0.0027 | g |
| THF/TEA | | | | 4.3 | mL |

In a 20 mL scintillation vial, click crosslinker (3) (1 eqv.) was dissolved in 2 mL 1:1 Tiff/TEA with 2 mol % catalyst. In a second vial, PEG-1000 azide (1.41 eqv.) was dissolved in 2 mL Tiff/TEA. The PEG and crosslinker/catalyst solutions were mixed via injection over micro-filter in a small dish, and evaporate under a crystallization dish. The membrane was delaminated with acetone (or water), dried over filter paper, then in a vacuum oven, and stored flat. The resulting film was an opaque, rough, wavy film.

TABLE 4

| Reagent Name | Mol. Wt. | Eq. | Mol. | Measured | Unit |
|---|---|---|---|---|---|
| Click crosslinker (3) | 240.27 | 1.00 | 0.000133 | 0.032 | g |
| PEG-1000 azide | 1100 | 1.32 | 0.000176 | 0.194 | g |
| CuBr(PPh$_3$)$_3$ | 930.325 | 0.022 | 2.9E-06 | 0.0027 | g |
| THF/TEA | | | | 2.5 | mL |

Figure 11:
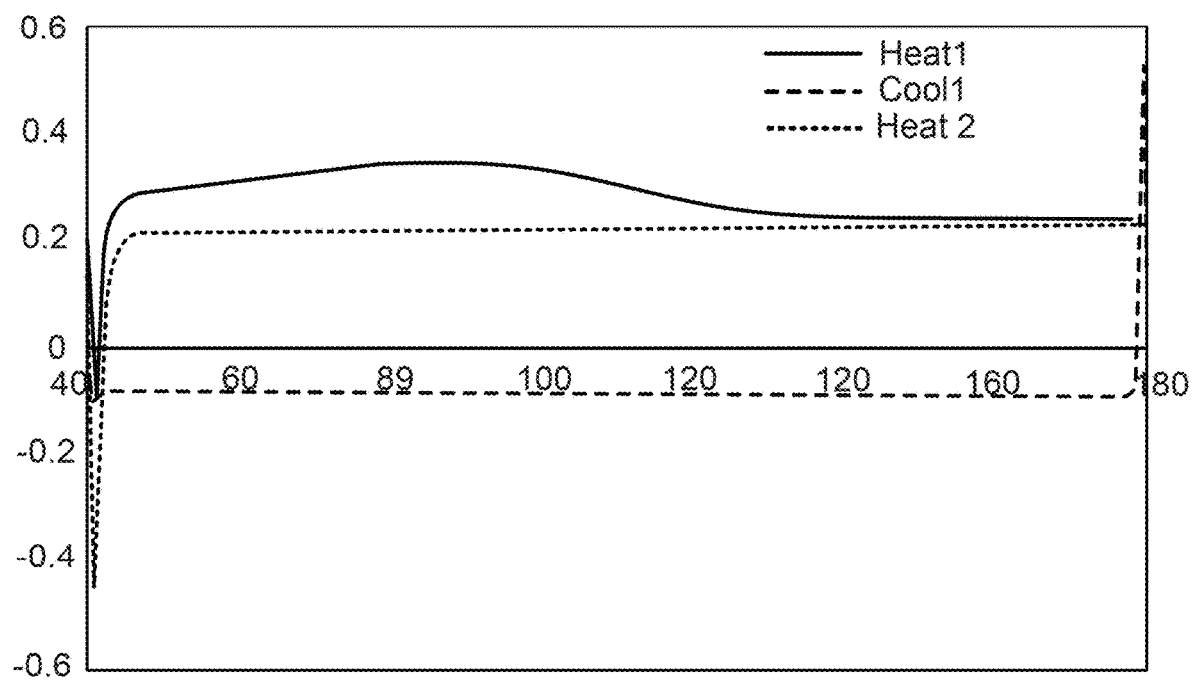
FIG. 11 is a DSC thermogram of a membrane formed from a click crosslinked PEG compound.

In a 20 mL scintillation vial, click crosslinker (3) (1 eqv.) was dissolved in 2 mL 1:1 THF/TEA with 2 mol % CuBr (PPh$_3$)$_3$ catalyst. In a second vial, PEG-1000 azide (1.32 eqv.) was dissolved in 2 mL THF/TEA. The PEG and crosslinker/catalyst solutions were mixed via injection over micro-filter in a small dish and evaporated under a large glass cover with an air-gap. The resulting film was a translucent, clear, homogeneous film. DSC indicated no thermal transitions at elevated temperatures (>40° C.), suggesting that the click crosslinked $CO_2$-philic membranes are rubbery materials (see FIG. 11).

0.5 Mol % Copper Catalyst

Membranes were prepared containing the components listed in Table 5.

TABLE 5

| Reagent Name | Mol. Wt. | Eq. | Mol. | Measured | Unit |
|---|---|---|---|---|---|
| Click crosslinker (3) | 240.27 | 1.00 | 8.32E-05 | 0.02 | g |
| PEG-1000 azide | 1100 | 1.51 | 0.000125 | 0.138 | g |
| CuBr(PPh$_3$)$_3$ | 930.325 | 0.005 | 4.3E-07 | 0.0004 | g |
| THF/TEA | | | | 4 | mL |

In a 20 mL scintillation vial, click crosslinker (3) (1 eqv.) was dissolved in 2 mL 1:1 THF/TEA with 0.5 mol % CuBr(PPh$_3$)$_3$ catalyst (4 mg CuBr(PPh$_3$)$_3$ dissolved in 1 mL THF/TEA, injecting 0.1 mL aliquot). In a second vial, PEG-1000 azide (1.51 eqv.) was dissolved in 2 mL THF/TEA. The PEG and crosslinker/catalyst solutions were mixed in a small dish. The solvent was allowed to evaporate slowly (overnight) under a small glass cover.

21 Mol % Click Crosslinker

Membranes were prepared containing the components listed in Tables 6 and 7.

TABLE 6

| Reagent Name | Mol. Wt. | Eq. | Mol. | Wt % | Measured | Unit |
|---|---|---|---|---|---|---|
| Click crosslinker (3) | 240.27 | 1.00 | 0.000195613 | 0.20614 | 0.047 | g |
| PEG-1000 azide | 1100 | 0.84 | 0.000164545 | 0.79386 | 0.181 | g |
| CuBr(PPh$_3$)$_3$ | 930.325 | 0.025 | 24.94451E-06 | | 0.0046 | g |
| THF/TEA | | | | | 8 | mL |

TABLE 7

| Reagent Name | Mol. Wt. | Eq. | Mol. | Wt % | Measured | Unit |
|---|---|---|---|---|---|---|
| Click crosslinker (3) | 240.27 | 1.00 | 0.000274691 | 0.285714 | 0.066 | g |
| PEG-1000 azide | 1100 | 0.55 | 0.00015 | 0.714286 | 0.165 | g |
| CuBr(PPh$_3$)$_3$ | 930.325 | 0.025 | 6.98681E-06 | | 0.0065 | g |
| THF/TEA | | | | | 8 | mL |

In a 20 mL scintillation vial, click crosslinker (3) was dissolved in 2 mL 1:1 THF/TEA with 2 mol % CuBr(PPh$_3$)$_3$ catalyst. In a second vial, PEG-1000 azide was dissolved in 2 mL THF/TEA. The PEG and crosslinker/catalyst solutions were mixed via injection over micro-filter in a small dish, and evaporated under a large crystallization dish with an air-gap. Both films gave opaque, rough, wavy films. XRD diffractograms of PEG crosslinked with the CO$_2$-philic click crosslinker (3) showed a broad amorphous peak of chain packing with additional crystallinity above stoichiometric loadings of CO$_2$-philic crosslinker, 21-29% CO$_2$-philic crosslinker loading by weight (FIG. 8).

As described in this example, the click crosslinker (3) was polymerized with PEG bis(azides) from 1:1 (vol/vol) tetrahydrofuran:triethylamine (THF:TEA) and 0.5-2 mol % copper catalyst bromotris (triphenylphosphine)copper (I) with PEG having an average molecular weight (MW)=1100. Visual evidence of crosslinking was observed in bulk solution at room temperature within seconds. Amorphous films amenable to permeation testing were readily obtained by injecting separate solutions of the click crosslinker (3) (0.03 M in 1:1 THF:TEA) with 2 mol % catalyst, and bis(azide) PEG (0.05 M in 1:1 THIF:TEA), over microfilters (45 m mesh), used to inhibit particulates that would promote nucleation, into a PTFE dish, followed by evaporation at room temperature under a crystallization dish, elevated on one side with a septum cap to enable air flow. Dish-casting was evaluated with ~200 mg total reactant mass in 4 mL total solvent volume, evaporating in 5 cm diameter PTFE dishes such that the solvent height was ~5 mm in the dish. The crosslinked films were easily removed from the PTFE dish following evaporation, though dish-casting in glass required treatment with water or acetone for easy removal.

Example 6—Pure Gas and Mixed Gas Permeation Tests

Gas permeation tests of the photocurable and click PEG membranes were conducted using a constant volume, variable pressure technique. The downstream side of the membrane was maintained at less than 25 torr using a vacuum pump. To keep the feed composition constant, a retentate stream was applied. The retentate flow was adjusted to 100 times the permeate flow. The composition of the permeate stream was measured using a Shimadzu GC equipped with a thermal conductivity detector. A pump (Teledyne Isco) was used to control the feed pressure. The feed gas was heated to 90° C. to maintain the feed above its hydrocarbon dew point of ~70° C. at 800 psi. The membrane cell was kept at room temperature.

Permeability was calculated using Equation 1, where y$_i$ is the downstream mole fraction, l the membrane thickness and $\Delta f_i$ the partial fugacity difference across the membrane. A fugacity driving force was used rather than partial pressure to correct for gas phase non-idealities. Fugacity coefficients were calculated using the Peng-Robinson equation of state. The steady-state flux, or fluxtotal, was calculated by measuring the downstream pressure rise (dp/dt) after 30 minutes of permeation time. This time was well beyond the steady-state time estimated from 14× the pure gas time lag, which equated to ~10 minutes for the slowest gas, methane. At 800 psi, the permeability was measured after 1 hour of permeation time to allow for any swelling induced relaxations to set-in.

$$P_i = \frac{\text{flux}_{total} \cdot y_i \cdot l}{\Delta f_i} \quad (1)$$

$$SF = \frac{[y_i/y_j]}{[x_i/x_j]} \quad (2)$$

$$\alpha_f = P_i/P_j \quad (3)$$

Figure 12:
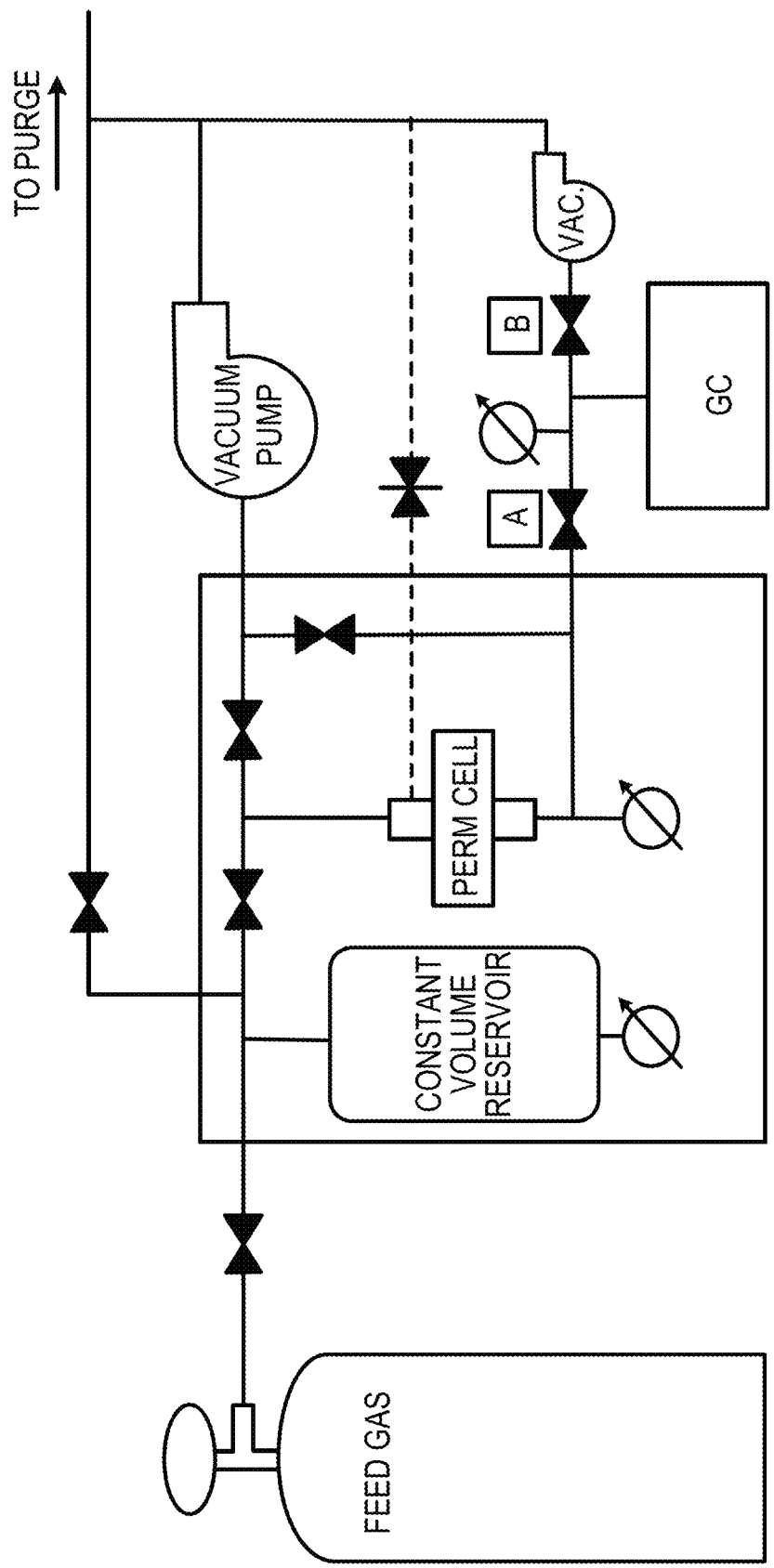
FIG. 12 shows the gas permeation cell used for pure and mixed gas experimentation.

Fugacity selectivity (Equation 3) was obtained by taking the ratio of gas permeabilities described in Equation 1. A schematic of the gas permeation cell is shown in FIG. 12.

Figure 13:
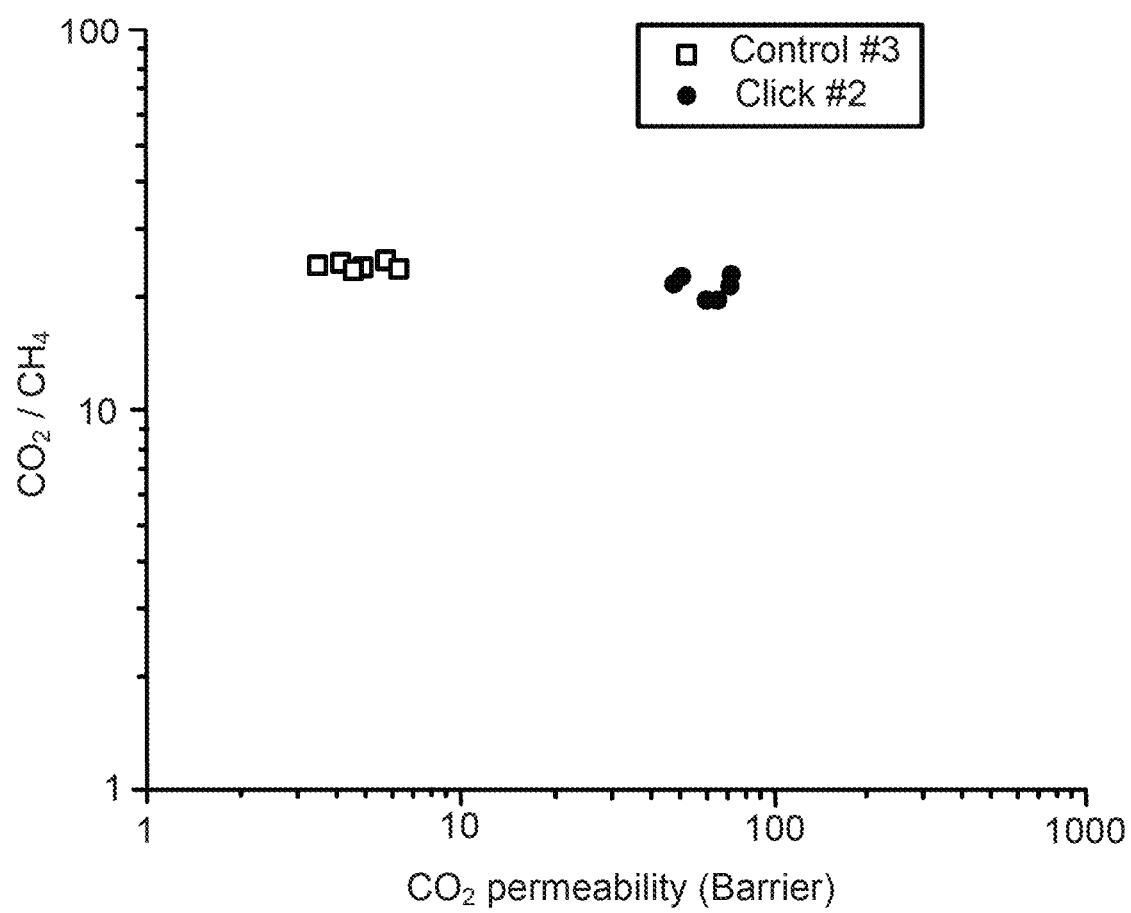
FIG. 13 shows permeability results of a $CO_2$-philic click crosslinked PEG membrane and a PEG crosslinked membrane without a $CO_2$-philic crosslinker.

The transport properties of both the CO$_2$-philic photocrosslinker and the click crosslinker are shown in Tables 8-10 and FIG. 13. In all cases, the CO$_2$-philic crosslinker showed greatly improved transport properties compared to control cellulose acetate (CA; a widely used commercialized membrane in natural gas separations) and PEG membranes crosslinked without CO$_2$-philic crosslinkers. CO$_2$-philic photocrosslinked membranes showed similar CO$_2$/CH$_4$ selectivities compared to PEG membrane without CO$_2$-philic crosslinkers, but CO$_2$ permeabilities were increased from 3.3-4.8 Barrer to 114.7-123.6 Barrer in the CO$_2$-philic photocrosslinked samples, a 2,475-3,375% increase in CO$_2$ permeability. These improvements were demonstrated in binary gas mixtures of CO$_2$/CH$_4$ up to 800 psi:

200 psi: CO$_2$—114.7 barrer, CO$_2$/CH$_4$—19.488

500 psi: CO$_2$—123.6 barrer, CO$_2$/CH$_4$—19.948

800 psi: CO$_2$—119.2 barrer, CO$_2$/CH$_4$—18.512

Table 8 shows the permeation results, CO$_2$/CH$_4$ binary (20% CO$_2$/80% CH$_4$) for photocrosslinked PEG membrane with CO$_2$-philic crosslinker (1) at various pressures.

TABLE 8

| Pressure | CO$_2$ perm (fug) | CH$_4$ perm (fug) | CO$_2$/CH$_4$ (fug) |
|---|---|---|---|
| 200 | 98.6 | 5.8 | 17 |
| 500 | 134 | 6.4 | 21 |
| 800 | 151 | 7.25 | 21.87 |
| 200 | 123 | 6.07 | 20.31 |
| 500 | 148 | 6.67 | 22.19 |
| 800 | 159 | 7.22 | 22.08 |

Tables 9 and 10 show the permeation results of the CO$_2$-philic click crosslinker membrane prepared according to Table 4 (Click membranes #1, #2, and #3) as compared to a similar PEG membrane crosslinked without a CO$_2$-philic crosslinker (Control membranes #1, #2, #3, and #4). Both pure gas at 100 psi for CO$_2$ and CH$_4$ and binary mixtures of CO$_2$ and CH$_4$ up to 800 psi were measured. As shown in FIG. 13, the CO$_2$-philic click crosslinked PEG membrane showed over a 1000% increase in CO$_2$ permeability as compared to PEG crosslinked without a CO$_2$-philic crosslinker.

TABLE 9

| Sample | Film Thickness (um) | Film Diameter (mm) | Gas | Upstream P (psi) | Permeation Cell | Vol. Extension | Temp (K) | Permeability (Barrer) |
|---|---|---|---|---|---|---|---|---|
| Control #1 | 6.5 | 10.992 | $CH_4$ | 100 | S + S | CLSD | 298 | 0.139 |
| Control #1 | 6.5 | 10.992 | $CO_2$ | 100 | S + S | CLSD | 298 | 4.368 |
| Control #2 | 6.5 | 12.252 | $CH_4$ | 100 | S + S | CLSD | 298 | 0.157 |
| Control #2 | 6.5 | 12.252 | $CO_2$ | 100 | S + S | CLSD | 298 | 4.852 |
| Click #1 | 85 | 8.09 | $CH_4$ | 100 | MB | CLSD | 298 | 4.487 |
| Click #1 | 85 | 8.09 | $CO_2$ | 100 | MB | CLSD | 298 | 104.784 |

TABLE 10

| Sample | Gas | P_up (psi) | $P(CO_2)$ (no f) | $P(CH_4)$ (no f) | $CO_2/CH_4$ | $P(CO_2)$ fug | $P(CH_4)$ fug | $CO_2/CH_4$ fug |
|---|---|---|---|---|---|---|---|---|
| Control #3 | $CO_2$—$CH_4$ binary | 200 | 4.5 | 0.2 | 23.152 | 4.9 | 0.2 | 24.127 |
| Control #3 | $CO_2$—$CH_4$ binary | 500 | 4.8 | 0.2 | 22.510 | 5.7 | 0.2 | 25.048 |
| Control #3 | $CO_2$—$CH_4$ binary | 800 | 4.6 | 0.2 | 19.995 | 6.2 | 0.3 | 23.855 |
| Control #4 | $CO_2$—$CH_4$ binary | 200 | 3.3 | 0.1 | 23.341 | 3.5 | 0.1 | 24.322 |
| Control #4 | $CO_2$—$CH_4$ binary | 500 | 3.5 | 0.2 | 22.161 | 4.2 | 0.2 | 24.656 |
| Control #4 | $CO_2$—$CH_4$ binary | 800 | 3.4 | 0.2 | 19.953 | 4.5 | 0.2 | 23.800 |
| Click #2 | $CO_2$—$CH_4$ binary | 200 | 61.8 | 3.3 | 18.645 | 66.3 | 3.4 | 19.429 |
| Click #2 | $CO_2$—$CH_4$ binary | 500 | 60.8 | 3.0 | 20.450 | 72.7 | 3.2 | 22.750 |
| Click #2 | $CO_2$—$CH_4$ binary | 800 | 53.9 | 3.0 | 17.940 | 72.1 | 3.4 | 21.405 |
| Click #3 | $CO_2$—$CH_4$ binary | 200 | 57.4 | 3.1 | 18.679 | 61.6 | 3.2 | 19.463 |
| Click #3 | $CO_2$—$CH_4$ binary | 500 | 41.6 | 2.1 | 20.032 | 49.8 | 2.2 | 22.280 |
| Click #3 | $CO_2$—$CH_4$ binary | 800 | 36.4 | 2.0 | 18.074 | 48.7 | 2.3 | 21.562 |

The improvements in transport properties using the $CO_2$-philic crosslinkers in PEG were further demonstrated in sour gas mixtures. Click crosslinked $CO_2$-philic PEG membranes showed similar improvements in $CO_2/CH_4$ properties under sour gas conditions as compared to the binary $CO_2/CH_4$ mixtures shown in this example, and also showed dramatic improvements in $H_2S/CH_4$ (sour gas) properties compared to PEG membranes crosslinked without a $CO_2$-philic crosslinker. In these conditions at 800 psi using a multi-component mixture of 3% $CO_2$, 5% $H_2S$, and 92% $CH_4$ (Sour Mix 1), the $CO_2$-philic click crosslinked PEG showed a 18,281% (~180×) improvement in $H_2S$ permeability and 343% (~4×) improvement in $H_2S/CH_4$ selectivity compared to control CA, and also showed 2696% (~29×) improvement in $H_2S$ permeability and 46% (~1.5×) improvement in $H_2S/CH_4$ selectivity compared to PEG crosslinked without a $CO_2$-philic crosslinker. Table 11 is a comparison of $H_2S$ transport properties of membranes containing control cellulose acetate (CA Control membranes #1 and #2), top performing PEBAX commercial grades (PA #1 and #2), $CO_2$-philic click crosslinked PEG (Click membrane #1) and PEG crosslinked without a $CO_2$-philic crosslinker (Control membranes #5 and #6) using the gas mixtures Sour Mix 1 (% $CO_2$, 5% $H_2S$, and 92% $CH_4$), SGS business case (10% $CO_2$, 20% $H_2S$, 57% $CH_4$, 3% $C_2H_6$, and 10% $N_2$), or 3-component ($H_2S$) (3% $CO_2$, 5% $H_2S$, and 92% $CH_4$).

TABLE 11

| Sample Name | Gas Comp | P_up (psi) | $P(CO_2)$ (no f) | $P(H_2S)$ (no f) | $P(CH_4)$ (no f) | $CO_2/CH_4$ | $H_2S/CH_4$ |
|---|---|---|---|---|---|---|---|
| Control CA #1 | Sour Mix 1 | 800 | 3.3 | 3.1 | 0.1 | 32.109 | 29.781 |
| Control CA #1 | Sour Mix 1 | 800 | 3.3 | 3.2 | 0.1 | 30.665 | 29.515 |
| Control CA #1 | Sour Mix 1 | 800 | 3.4 | 2.2 | 0.1 | 34.792 | 21.827 |

TABLE 11-continued

| Sample Name | Gas Comp | P_up (psi) | P(CO$_2$) (no f) | P(H$_2$S) (no f) | P(CH$_4$) (no f) | CO$_2$/CH$_4$ | H$_2$S/CH$_4$ |
|---|---|---|---|---|---|---|---|
| Control CA #1 | Sour Mix 1 | 800 | 3.1 | 2.7 | 0.1 | 33.262 | 28.801 |
| Control CA #1 | Sour Mix 1 | 800 | 3.1 | 2.9 | 0.1 | 31.869 | 29.902 |
| Control CA #1 | Sour Mix 1 | 800 | 3.0 | 3.0 | 0.1 | 30.284 | 29.845 |
| Control CA #2 | SGS business case | 200 | 3.8 | 4.2 | 0.1 | 33.967 | 37.374 |
| Control CA #2 | SGS business case | 500 | 12.8 | 18.5 | 0.5 | 26.162 | 37.774 |
| Control CA #2 | SGS business case | 800 | 28.9 | 55.2 | 1.4 | 20.033 | 38.199 |
| Control CA #2 | SGS business case | 200 | 16.7 | 20.3 | 0.6 | 27.798 | 33.870 |
| PA #1 | 3-component (H$_2$S) | 800 | 133.4 | 759.8 | 8.9 | 15.07 | 86 |
| PA #2 | 3-component (H$_2$S) | 800 | 72.3 | 425.6 | 4.1 | 17.55 | 102.8 |
| Control #5 | 3-component (H$_2$S) | 200 | 3.3 | 15.8 | 0.2 | 21.744 | 103.533 |
| Control #5 | 3-component (H$_2$S) | 500 | 3.7 | 17.3 | 0.2 | 20.430 | 94.208 |
| Control #5 | 3-component (H$_2$S) | 800 | 4.1 | 18.3 | 0.2 | 19.696 | 88.537 |
| Control #6 | 3-component (H$_2$S) | 200 | 3.0 | 14.0 | 0.1 | 22.205 | 104.731 |
| Control #6 | 3-component (H$_2$S) | 500 | 3.4 | 15.7 | 0.2 | 20.556 | 94.729 |
| Control #6 | 3-component (H$_2$S) | 800 | 3.8 | 17.2 | 0.2 | 17.747 | 81.469 |
| Click #1 | 3-component (H$_2$S) | 200 | 57.3 | 370.8 | 2.9 | 19.8 | 127.862 |
| Click #1 | 3-component (H$_2$S) | 500 | 69.5 | 436.7 | 3.4 | 20.4 | 128.441 |
| Click #1 | 3-component (H$_2$S) | 800 | 79 | 496.3 | 4.0 | 19.8 | 124.075 |

Example 7—Membranes Formed from Click Crosslinking

Dish-casting with the procedures described in Example 5 resulted in films with crystallinities that increased with crosslinker concentration as shown by PXRD, as well as the formation of prismatic single crystals at the solvent-air interface as shown by optical microscopy. Dish-casting likely resulted in crosslinking followed by aggregation and crystallization of excess crosslinker. In order to inhibit detrimental crystallization and promote film-forming properties of the membranes, the following examples can be performed.

Heated Film Formation to Inhibit Crystallization

Crystallization is a fundamentally kinetic process, and slow evaporation is always recommended for the growth of high quality single crystals. Applying heat to the dish-cast is likely to accelerate the rate of crosslinking over crystallization as well as inhibit crystal growth. Film formation is also sensitive to dish casting conditions, and requires balancing the rate of crosslinking with solvent evaporation. Dish-casting at 50° C. on the benchtop results in an amorphous gel-like material, but rapid evaporation of THF/TEA gives inhomogeneous film formation with scattered patches of polymer monoliths. In contrast, dish-casting at 40° C. under a crystallization dish with an air-gap yields uniform films across the PTFE dishes for both 21 and 29 wt % crosslinker films that are fully amorphous. In both cases, however, the films are notably soft and adhesive, making them difficult to handle, particularly with 29 wt % crosslinker loading. It is likely that the increased rate of crosslinking with heat and excess crosslinker results in decreasing membrane gel fraction, favoring the production of telechelic PEG chains with free alkynes rather than a fully crosslinked network.

Improving Crosslink Density Via Addition of Secondary Crosslinkers

Strategies to improve crosslinking across the fraction of telechelic PEG may take advantage of the reactivity of alkynes to join chain ends as shown in Scheme 5.

Scheme 5

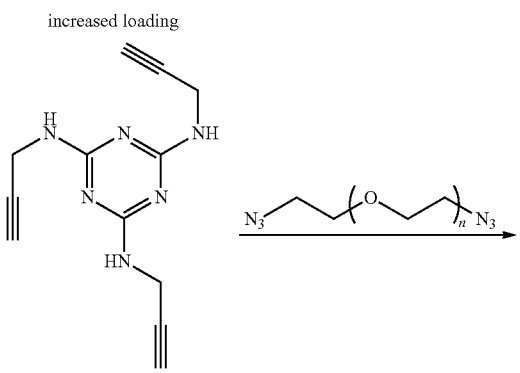

increased loading

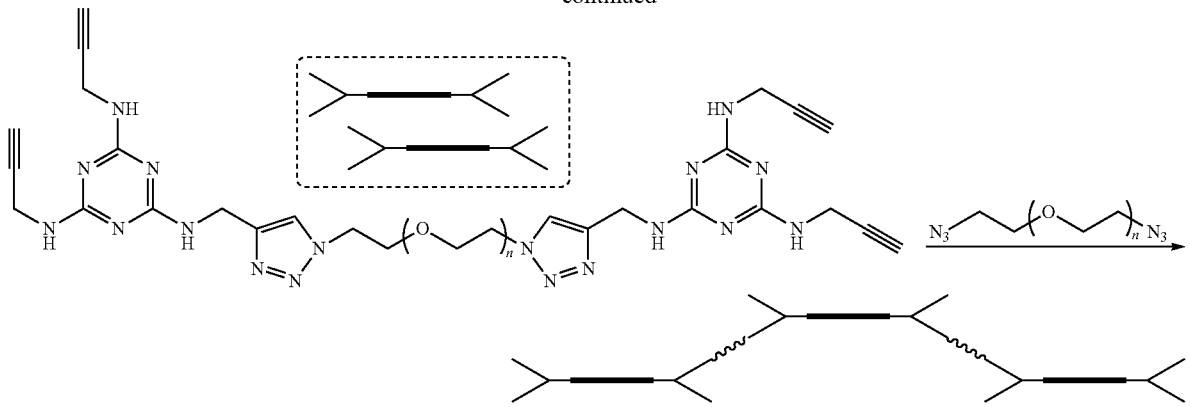

An additional small molecule may be introduced to join telechelic polymers depending on the extent of crosslinking, mobility of a small molecule through the network, and the inter-chain spacing between reactive ends. As a simple approach, treating the polymer with a short PEG bis(azide), 1,11-diazido-3,6,9-trioxaundecane (three EG repeat units, MW=244) in 1:1 THF:TEA should drive crosslinking toward completion and rigidify the membrane. It is possible that an added polymerization step may be ineffective, where the swelling of the network, telechelic polymerization, and subsequent drying steps may disrupt film quality, or may react inhomogeneously across the film, or fail to penetrate throughout the depth of the film, leaving unreacted polymer below the surface. To circumvent these issues, the small PEG bis(azide) may be added at low loading during initial dish-casting; adding 25 mol % of this linker relative to the crosslinker would be theoretically sufficient to yield a fully crosslinked network from telechelic PEG MW=1100 chains, as depicted in Scheme 6. Scheme 6 shows orthogonal routes to crosslinking telechelic polymer with increased crosslinker loading via a) Sonogashira coupling and b) Glaser coupling.

Scheme 6

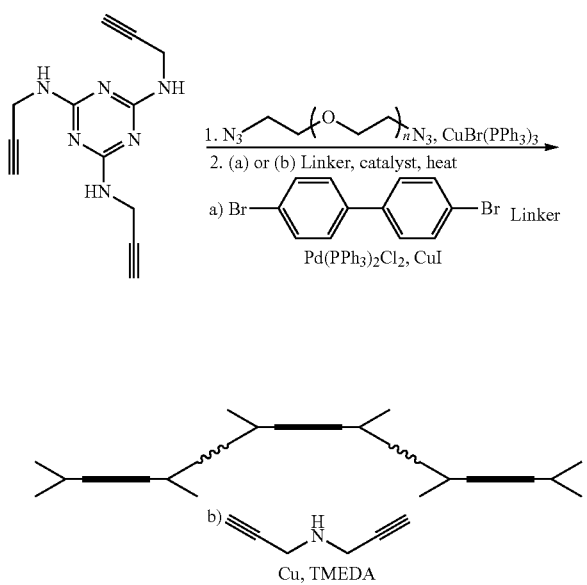

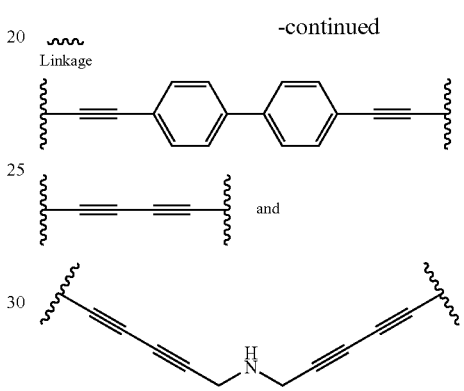

This scenario assumes no crosslinking during the initial alkyne-azide click coupling, which is reasonable at 29 wt % of crosslinker given a 2:1 molar ratio of crosslinker:PEG. 25 mol % of the short PEG would render the linker at half the concentration of PEG MW=1100, which favors its utility toward crosslinking after the initial click reaction, but would also involve some degree of wasteful coupling between the click crosslinker and the small PEG linker in competition with PEG MW=1100.

Another strategy to overcome these issues would be introduction of a linker with orthogonal reactivity to the alkyne-azide system to independently perform initial functionalization of PEG with the click crosslinker followed by crosslinking of the telechelic polymer. Shown in Scheme 6, Sonogashira and Glaser couplings both offer orthogonal routes for joining unreacted chain ends. In this case, all reactants and catalysts will be loaded into the initial dishcast. Alkyne-azide click coupling will occur readily at 40° C., whereas crosslinking via the secondary alkyne coupling will require elevated temperatures. In Scheme 6a, loading 25 mol % 4,4'-dibromobiphenyl with 2-4 mol % Pd(II) and CuI will enable Sonogashira coupling of free alkynes upon heating to 60-80° C. over the course of hours. This coupling reaction proceeds readily in 1:1 THF:TEA and should require little to no purification provided sufficiently low catalyst concentrations. However, this route involves the important limitation of requiring air-free conditions to prevent deactivation of the Pd catalyst. In Scheme 6b, loading dipropargylamine with 5-20 mol % Cu and tetramethylethylenediamine (TMEDA) in air should enable Glaser-Hay coupling at 50° C., including both homocoupling of telechelic polymer alkynes as well as heterocoupling with dipropargylamine, which will act as a secondary linker. This route is more direct in that it can directly link polymer chain ends. In both cases, catalyst stability, tolerance for the reactants within the reaction mixture, efficacy toward crosslinking, and ease of processing will determine which is the more suitable strategy.

Figure 14:
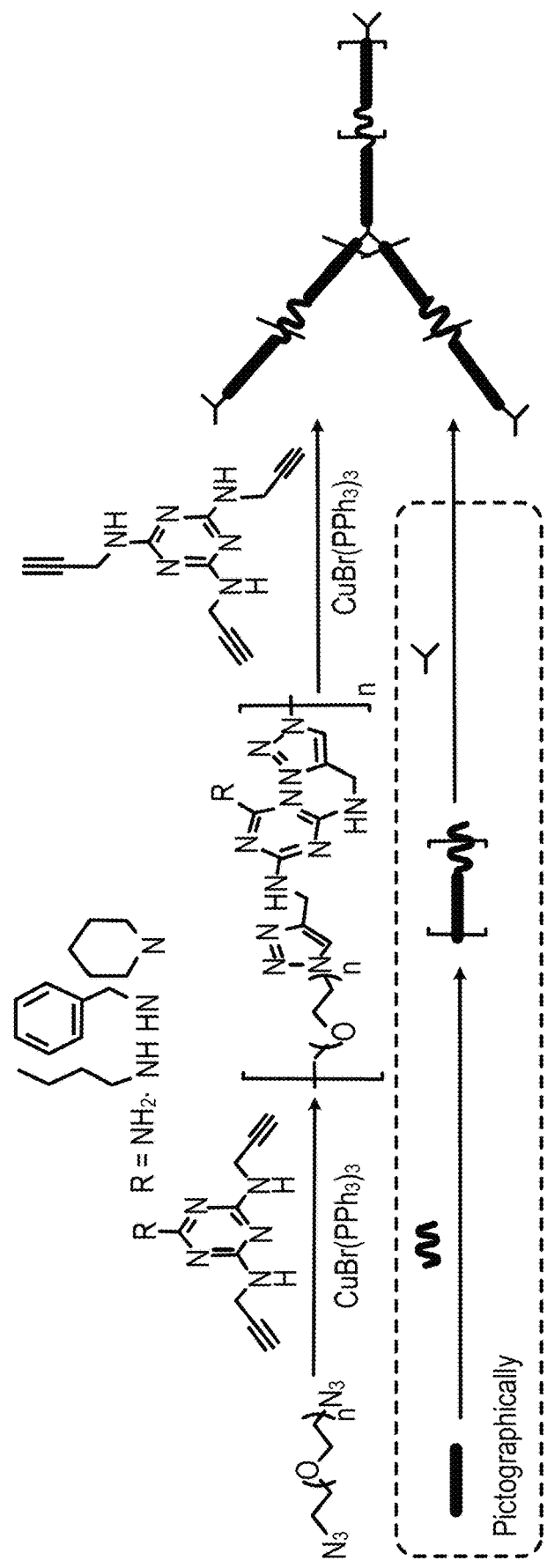
FIG. 14 illustrates a synthetic scheme involving chain extension with a dialkyne-substituted triazine monomer to reduce crosslink density while maintaining high triazine content.

Further, a one or two-pot reaction can be implemented to tune the crosslink density while retaining high nitrogen content as shown in FIG. 14. FIG. 14 shows chain extension with a dialkyne substituted triazine monomer to reduce crosslink density while maintaining high triazine content.

First PEG bis(azide) can react through telechelic coupling/chain extension with a dialkyne substituted triazine monomer. This dialkyne substituted monomer can be synthesized through the addition of one molar equivalent of an amine nucleophile (for example, $NH_3$, butylamine, benzylamine, or piperidine) and excess aminopropyne to cyanuric fluoride. Next, the dialkyne substituted monomer is reacted with PEG bis(azide). Depending on stoichiometry and catalyst activity, a distribution of linear PEG-triazine oligomers is produced. Next, the PEG-bis(azide)-terminated oligomers react with the trialkyne substituted melamine crosslinker to form a fully gelled network polymer. By tuning the oligomer chain length in the first step, the resulting network polymer can vary in crosslink density while maintaining high incorporation of $CO_2$-phyllic triazine moieties. A lower crosslink density should lead to higher polymer flexibility and therefore further increased permeability compared to the PEG bis(azide)-trialkyl melamine system.

Increased Crosslinker Content for Enhanced $CO_2$-Philicity Via Lower Molecular Weight PEG PEG avg. MW=1000 showed the best performance among PEG chains of both higher and lower molecular weight. The effects of PEG MW in concert with the $CO_2$-philic crosslinker may lead to differences in performance with MW. In addition, lower MW PEG led to increased wt % loading of the crosslinker to maintain stoichiometric quantities of reactants: 21, 29, and 44 wt % for 600, 400, and 200 MW PEG, respectively. Scheme 7 illustrates the reaction scheme.

Scheme 7

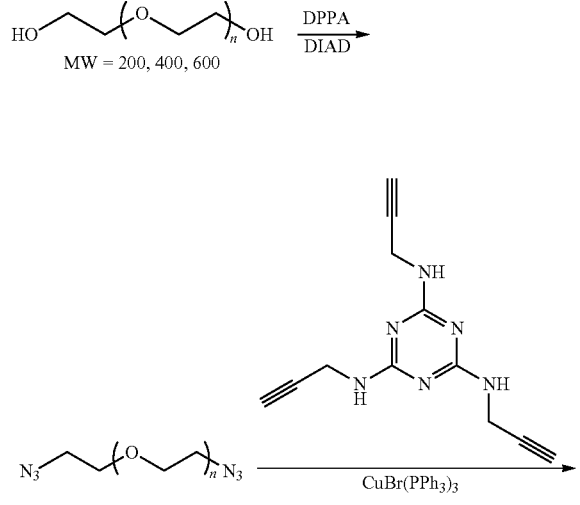

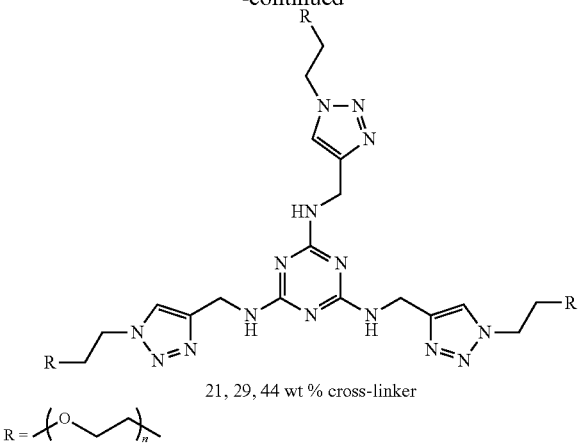

21, 29, 44 wt % cross-linker

The optimized dish-casting conditions described should be readily translated to these membranes, giving fully crosslinked films with increased loading of the crosslinker relative to PEG MW=1100. Direct comparison of the effects of crosslinker loading vs PEG molecular weight on transport properties can be determined. For example, 29 wt % films with a stoichiometric quantity of click crosslinker (3) in PEG MW=400 films will have higher crosslink density relative to doped membranes of PEG MW=1100, and thus may show improved $CO_2$ permeabilities and selectivities. As an extreme, ethylene glycol (MW=62) could be functionalized to 1,2-diazidoethane, which would give a crosslinked network of 72 wt % in the click crosslinker, the performance of which would dominantly reflect the transport properties of the $CO_2$-philic crosslinker.

Increased Crosslinking Efficiency Under Non-Oxidizing Atmosphere

Cu(I), used as a catalyst for the azide-alkyne cycloaddition reaction, is inherently unstable. It can undergo disproportionation to Cu(0) and Cu(II), or it can be oxidized by oxygen in air to Cu(II). Membranes are typically cast under air, so use of a non-oxidizing gas for the headspace would help prevent formation of catalytically inactive Cu(II) species, resulting in increased crosslinking efficiency of the polymers. In a modification of the procedure described in this example, dry ice could be introduced under the capping crystallization dish, most preferably insulated from the hotplate surface by some glass wool in a beaker; sublimation of the dry ice would displace air, resulting in longer catalyst lifetime and increased crosslinking efficiency.

Crosslinkers such as $CO_2$-phillic melamine can interact best with select gases of interest in specific conformations. Computational modeling demonstrated preferable orientations of $CO_2$ interacting with melamine crosslinkers. Interactions with $CO_2$ are maximized in planar configurations of the secondary amines. However, these selector moieties may be fixed in unpreferred conformations in a fully crosslinked polymer. To address this, an additive may be used during the crosslinking step to act as a template to help arrange the flexible moieties into ideal conformations, which are then fixed in place upon completion of crosslinking. Most preferable, these additives are isolobal to the gas of interest. For the specific case of using additives to increase $CO_2$-transport properties of melamine containing membranes, crosslinking additives could include $CO_2$ itself, carbon disulfide, organic isocyanates, and carbodiimides.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of preparing a $CO_2$-philic membrane, comprising:
   reacting a PEG acrylate compound with a melamine-based crosslinker in the presence of a photocrosslinking initiator; and
   curing the resulting mixture under UV irradiation to form a membrane.

2. The method of claim 1, wherein the PEG acrylate compound is a PEG-diacrylate (PEGDA) compound, a PEG-methyl ether acrylate (PEGMEA) compound, or combination thereof.

3. The method of claim 2, wherein the PEGDA compound has the formula:

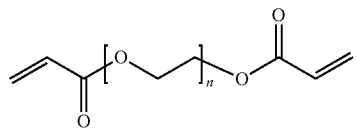

wherein n is an integer between 1 and 100 or between 4 and 50 or between 4 and 20.

4. The method of claim 2, wherein the PEGMEA compound has the formula:

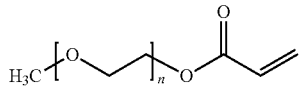

wherein n is an integer between 1 and 100 or between 4 and 50 or between 4 and 20.

5. The method of claim 2, wherein the melamine-based crosslinker has the formula:

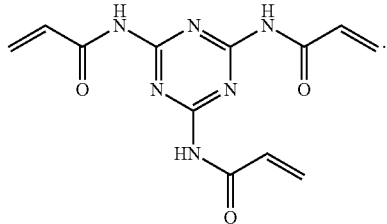 [SMILES: C=CC(=O)Nc1nc(NC(=O)C=C)nc(NC(=O)C=C)n1]

6. The method of claim 5, further comprising preparing the melamine-based crosslinker by reacting 1,3,5-triazine-2,4,6-triamine with acryloyl chloride.

7. A method of preparing a $CO_2$-philic membrane, comprising:
   reacting a PEG azide compound with a melamine-based crosslinker in the presence of a copper catalyst; and
   drying the resulting mixture to form a membrane.

8. The method of claim 7, wherein the PEG azide compound is a compound having the formula:

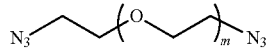

wherein m is an integer between 1 and 100 or between 4 and 50 or between 4 and 20.

9. The method of claim 7, wherein the melamine-based crosslinker has the formula:

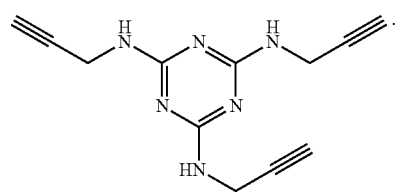 [SMILES: C#CCNc1nc(NCC#C)nc(NCC#C)n1]

10. The method of claim 9, further comprising preparing the melamine-based crosslinker by reacting 2,4,6-trifluoro-1,3,5-triazine with prop-2-yn-1-amine.

11. A method of separating $CO_2$ and $H_2S$ from natural gas, comprising:
   providing a $CO_2$-philic membrane comprising a $CO_2$-philic polyethylene glycol (PEG) compound of Formula (I):

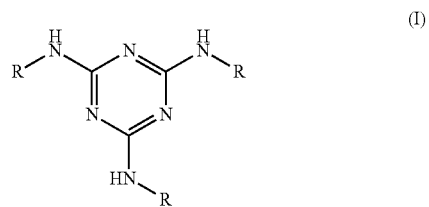

wherein:
   R is selected from:

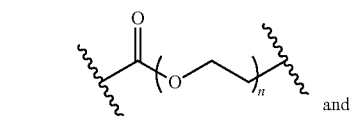
and

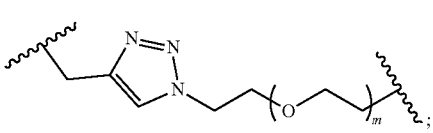

each n is independently an integer between 1 and 100; and
   each m is independently an integer between 1 and 100;
introducing a natural gas stream to the membrane; and
removing $CO_2$ and $H_2S$ from the natural gas.

12. The method of claim 11, wherein the compound of Formula (I) is selected from:
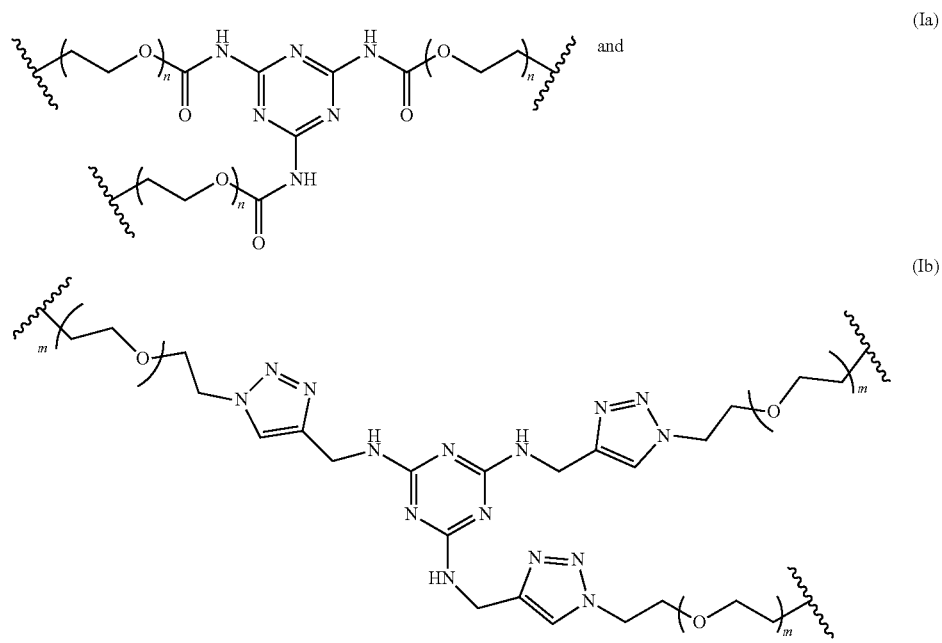
wherein:
  each n is independently an integer between 4 and 50; and
  each m is independently an integer between 4 and 50.
* * * * *